(12) United States Patent
Li et al.

(10) Patent No.: US 9,430,083 B2
(45) Date of Patent: Aug. 30, 2016

(54) CONTROL METHOD AND ELECTRONIC APPARATUS

(71) Applicant: Lenovo (Beijing) Co., Ltd., Beijing (CN)

(72) Inventors: Xiang Li, Beijing (CN); Yitang Zhuang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 88 days.

(21) Appl. No.: 14/459,693

(22) Filed: Aug. 14, 2014

(65) Prior Publication Data

US 2015/0163446 A1    Jun. 11, 2015

(30) Foreign Application Priority Data

Dec. 11, 2013  (CN) .......................... 2013 1 0673689
Jan. 8, 2014   (CN) .......................... 2014 1 0008656

(51) Int. Cl.

| | | |
|---|---|---|
| *G06F 3/041* | (2006.01) | |
| *G03B 21/14* | (2006.01) | |
| *G03B 21/00* | (2006.01) | |
| *H04N 9/31*  | (2006.01) | |

(52) U.S. Cl.
CPC ............ *G06F 3/0416* (2013.01); *G03B 21/00* (2013.01); *G03B 21/147* (2013.01); *H04N 9/317* (2013.01); *H04N 9/3194* (2013.01)

(58) Field of Classification Search
CPC ............ G02B 27/017; G02B 27/0093; G02B 2027/014; G02B 2027/0178; G03B 21/00; G03B 21/147
See application file for complete search history.

(56) References Cited

U.S. PATENT DOCUMENTS

| | | | |
|---|---|---|---|
| 5,872,590 A    * | 2/1999 | Aritake ............. | H04N 13/0497 348/54 |
| 2010/0073773 A1 * | 3/2010 | Hotta ..................... | G02B 27/01 359/630 |
| 2012/0069180 A1 * | 3/2012 | Kawamura ............ | G03B 21/00 348/143 |
| 2015/0186039 A1 * | 7/2015 | Ide ........................ | G06F 3/0425 345/168 |

* cited by examiner

*Primary Examiner* — Sultan Chowdhury
(74) *Attorney, Agent, or Firm* — Brinks Gilson & Lione; G. Peter Nichols

(57) ABSTRACT

A control method applied in an electronic apparatus including a projecting unit and a depth detecting unit is described. The projecting unit is able to project first multimedia data onto a target object. The method includes detecting depth information of the target object by using a depth detecting unit; calculating a second parameter of the projecting unit according to the depth information of the target object and a first parameter of the projecting unit; and moving the projecting unit to a first position based on the second parameter of the projecting unit to make the projecting unit project a first display picture of the first multimedia data. The focusing of the projector can be executed quickly and accurately.

20 Claims, 12 Drawing Sheets

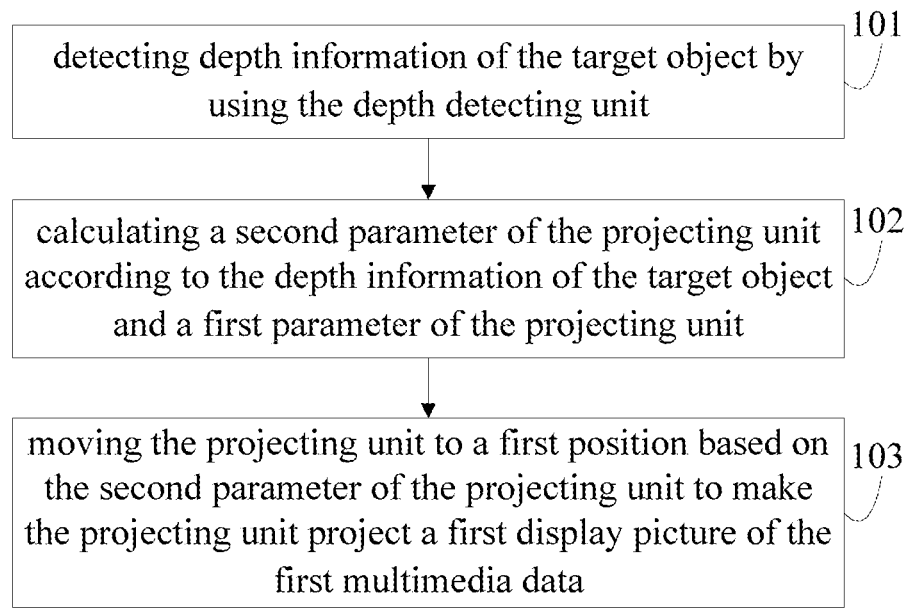
Figure 1
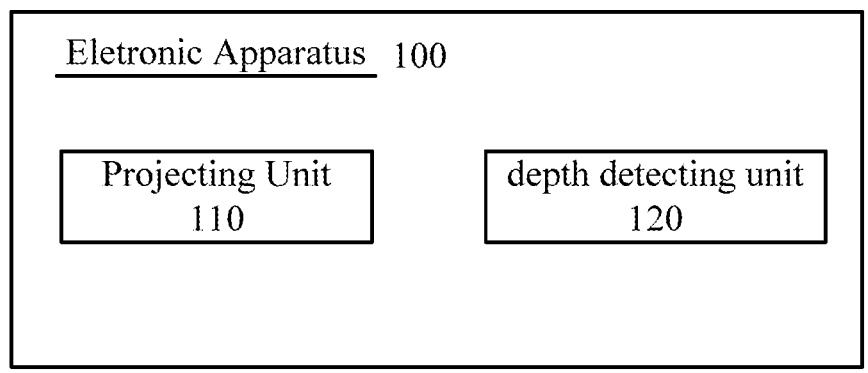
Figure 1.1

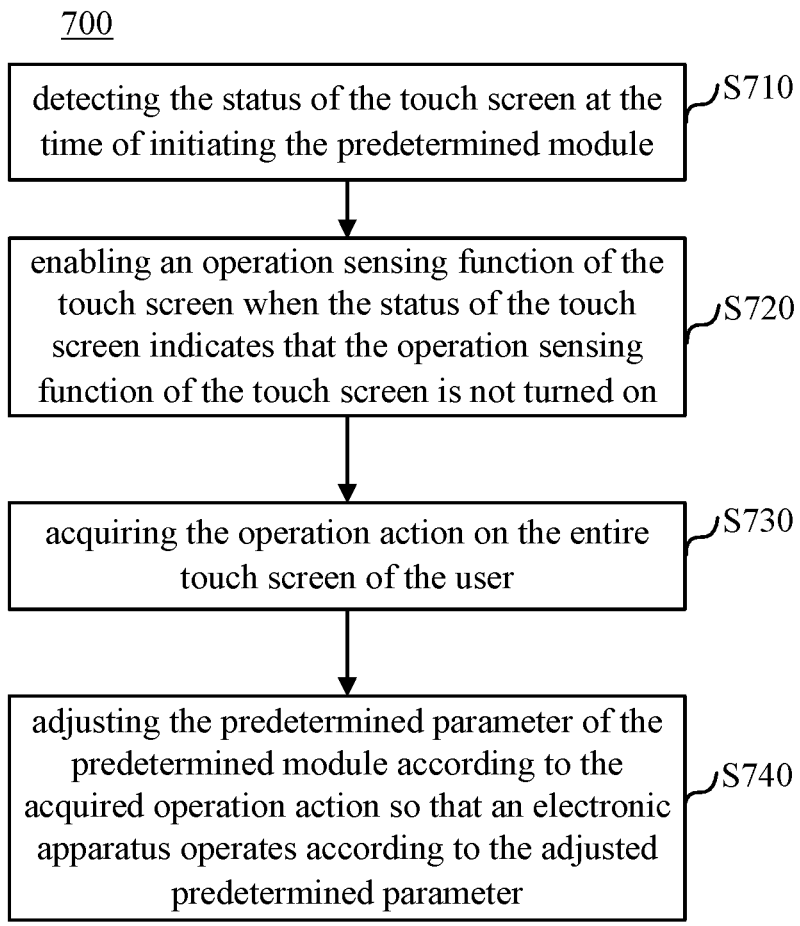
Figure 11
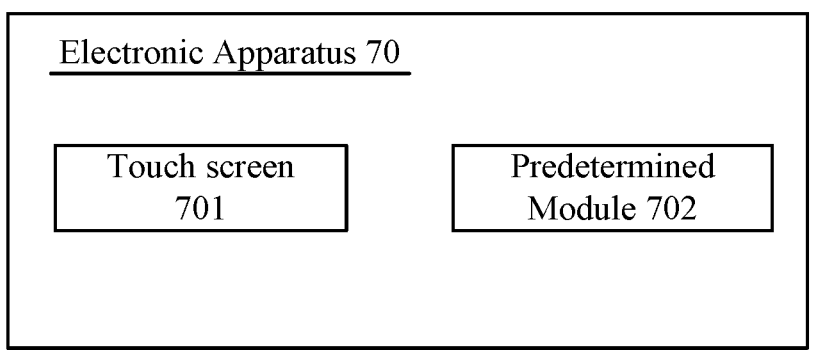
Figure 11.1

CONTROL METHOD AND ELECTRONIC APPARATUS

BACKGROUND

This application claims priority to Chinese patent application No. 201310673689.X filed on Dec. 11, 2013 and Chinese patent application No. 201410008656.8 filed on Jan. 8, 2014, the entire contents of which are incorporated herein by reference.

The present invention relates to a control technique, and particularly relates to a control method and an electronic apparatus.

A projector needs to adjust a position of an optical lens in the projector at the time of projecting, and then can project a clear image on a projecting plane, and this procedure is referred as focusing of the projector. Adjusting the position of the optical lens in the projector adopts two methods generally. One method is adjusting the position of the optical lens manually, operation of this method is troublesome and accuracy is low. Another method is moving the optical lens to a plurality of positions by using a step motor and recording definitions corresponding to the plurality of positions, and then obtaining a position having the highest definition, and moving the optical lens to the position having the highest definition. Time length of the focusing of this method is relatively long, and there is a case in which the focusing fails.

SUMMARY

On that account, a main purpose of the embodiments of the present invention is to provide a control method and an electronic apparatus which are able to execute the focusing of the projector quickly and accurately.

In order to achieve the above-described purpose, the technical solutions of the embodiments of the present invention are implemented as follows:

A control method applied in an electronic apparatus including a projecting unit and a depth detecting unit; the projecting unit being able to project first multimedia data onto a target object; the method includes: detecting depth information of the target object by using the depth detecting unit; calculating a second parameter of the projecting unit according to the depth information of the target object and a first parameter of the projecting unit; and moving the projecting unit to a first position based on the second parameter of the projecting unit to make the projecting unit project a first display picture of the first multimedia data.

An electronic apparatus including a projecting unit which is able to project first multimedia data onto a target object; the electronic apparatus further includes a depth detecting unit, a calculating unit and a control unit; wherein, the depth detecting unit is for detecting depth information of the target object; the calculating unit is for calculating a second parameter of the projecting unit according to depth information of the target object and a first parameter of the projecting unit; and the control unit is for moving the projecting unit to a first position based on the second parameter of the projecting unit to make the projecting unit project a first display picture of the first multimedia data.

In the technical solutions of the embodiments of the present invention, a distance between the projecting unit and the target object is determined by acquiring the depth information of the target object, and then the second parameter of the projecting unit is calculated based on the depth information of the target object and the first parameter of the projecting unit, so as to move the projecting unit to a corresponding position. Thus, fast and accurate focusing of the projector is implemented and user's experience is improved.

Other characteristics and advantages of the present invention are explained in the subsequent specification, and are obvious partly from the specification and can be understood by implementing the present invention. The objects and other advantages of the present invention can be implemented and obtained by structures pointed particularly in the specification, the claims and the accompanying drawings.

BRIEF DESCRIPTION OF THE DRAWINGS

In order to describe the technical solution of the embodiment of the invention more clearly, the accompanying drawings necessary for the description of the embodiments are explained simply. The accompanying drawings in the following description are only exemplary embodiments of the invention.

FIG. 1 is a schematic diagram of flow of a control method of the first embodiment of the present invention.

FIG. 1.1 shows an electronic apparatus with a projecting unit and a depth detecting unit according to the present invention.

FIG. 11 is a flow chart illustrating the first method for adjusting predetermined parameter according to the sixth embodiment of the present invention schematically.

FIG. 11.1 shows an electronic apparatus with a touch screen and predetermined module according to the present invention.

DETAILED DESCRIPTION

Figure 2:
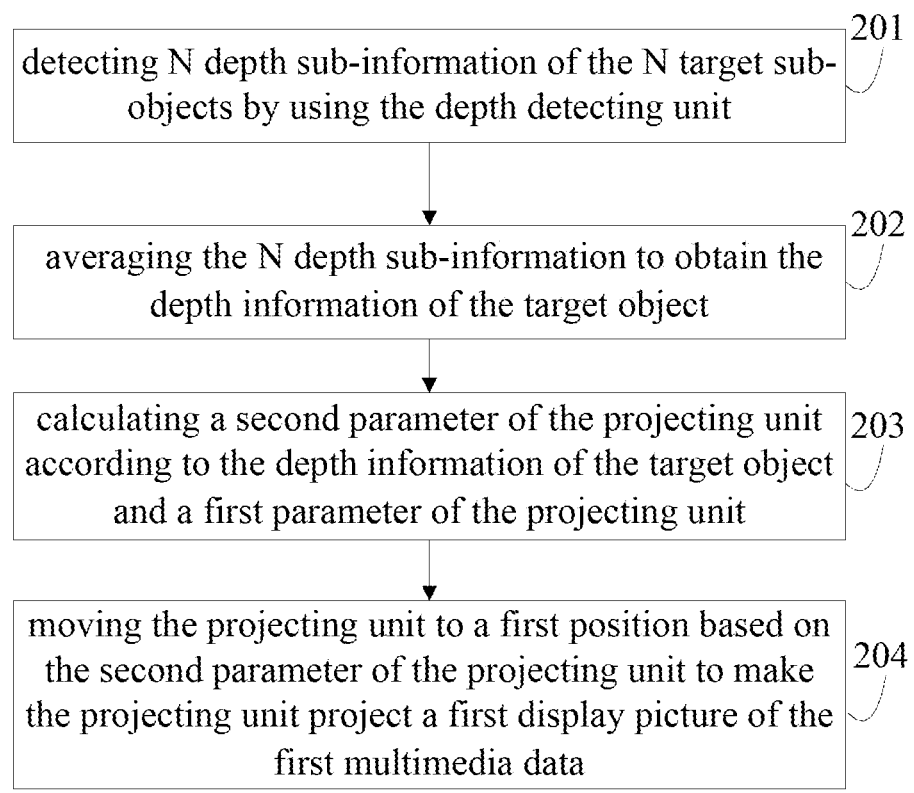
FIG. 2 is a schematic diagram of flow of a control method of the second embodiment of the present invention.

The respective preferable embodiments of the present invention are described with reference to the accompanying drawings hereinafter. The description with reference to the accompanying drawings is provided hereinafter to help to understand the exemplified embodiment of the present invention defined by the claim or the equivalent. It comprises various kinds of specific details helping understanding, and they are only regarded as schematic. Therefore, those skilled in the art would recognize that the embodiments described here can be made various kinds of alternation and modification without departing from the range and spirit of the present invention. Further, in order to make the specification more clear and brief, the detailed description on the well-known function and structure in the art would be omitted.

FIG. 1 is a schematic diagram of flow of a control method of the first embodiment of the present invention, and the control method of this example is applied in an electronic apparatus 100 including a projecting unit 110 and a depth detecting unit 120; the projecting unit 110 is able to project first multimedia data onto a target object; and in a preferable embodiment of the present invention, the control method includes the following steps:

Step 101: detecting depth information of the target object by using the depth detecting unit.

In specific implementation, the electronic apparatus may be a projector, and may be a terminal provided with a projecting apparatus. The projecting unit 110 in the electronic apparatus is a projecting lens having a projecting function, i.e., an optical lens, and performance of the projecting lens is characterized by two important parameters, which are focal length of the projecting lens and size of the projecting lens. The depth detecting unit 120 in the electronic apparatus is a depth detecting device having a depth detecting function, and this device can obtain the depth information of the target object by manners including but not limited to the following:

Transmitting electromagnetic wave to the target object and recording current moment as a first moment; receiving the electromagnetic wave returned by the target object and recording current moment as a second moment; and calculating the depth information of the target object according to time interval between the first moment and the second moment and velocity of transmission of the electromagnetic wave.

In the above-described solution, acquiring the depth information of the target object can be obtained through a formula (1a):

$$D = \frac{(T2-T1) \times c}{2} \quad (1a)$$

Wherein, D is the depth information of the target object, T1 is the first moment, T2 is the second moment, c is the velocity of the electromagnetic wave; and preferably, the electromagnetic wave is electromagnetic wave in infrared band.

In the above-described solution, the target object refers to a projecting plane. The first multimedia data may be picture data, video data or audio video data or the like.

Step 102: calculating a second parameter of the projecting unit according to the depth information of the target object and a first parameter of the projecting unit.

Here, the first parameter of the projecting unit includes two sub-parameters, which are focal length of the projecting unit and size of the projecting unit.

In the present embodiment, the second parameter of the projecting unit can be calculated based on acquired information such as the depth information of the target object, the focal length of the projecting unit, the size of the projecting unit or the like; the second parameter refers to a distance and a direction by which the projecting unit should move when the projecting unit projects the first display picture of the first multimedia data on the target object.

Step 103: moving the projecting unit to a first position based on the second parameter of the projecting unit to make the projecting unit project a first display picture of the first multimedia data.

Subsequent to step 102, the projecting unit is moved to the first position based on the distance and the direction by which the projecting unit should move, the first position refers to a position of the first display picture of the first multimedia data projected on the target object by the projecting unit; here, the first display picture is a most clear picture of the first multimedia data displayed on the target object.

Preferably, the projecting unit may be moved to the first position by a step motor connected to the projecting unit, thus, accuracy of movement of the projecting unit can be improved.

With the above-described technical solution of the embodiments of the present invention, fast and accurate focusing of the electronic apparatus is implemented, so as to make the first multimedia data which is most clear to be presented on the target object, it save a lot of time to execute the focusing manually, and improves efficiency of projection representation, which improves the user's experience.

FIG. 2 is a schematic diagram of flow of a control method of the second embodiment of the present invention, the control method in this example is applied in the electronic apparatus including the projecting unit and the depth detecting unit; the projecting unit is able to project the first multimedia data onto the target object; the target object includes N target sub-objects; N is an integer larger than 1; and in another preferable embodiment of the present invention, the control method includes the following steps:

Step 201: detecting N depth sub-information of the N target sub-objects by using the depth detecting unit.

In specific implementation, the electronic apparatus may be the projector, and may also be the terminal provided with the projecting apparatus. The projecting unit in the electronic apparatus is the projecting lens having the projecting function, i.e., the optical lens, and the performance of the projecting lens is characterized by two important parameters, which are the focal length of the projecting lens and the size of the projecting lens. The depth detecting unit in the electronic apparatus is the depth detecting device having the depth detecting function, with respect to each target sub-object, this device can obtain the depth information of the target sub-object by manners including but not limited to the following:

Transmitting the electromagnetic wave to the target sub-object and recording current moment as the first moment; receiving the electromagnetic wave returned by the target sub-object and recording current moment as the second moment; and calculating the depth information of the target sub-object according to time interval between the first moment and the second moment and the velocity of transmission of the electromagnetic wave.

In the above-described solution, acquiring the depth information of the target sub-object may also be obtained through a formula (1b):

$$D_i = \frac{(T2 - T1) \times c}{2} \quad (1b)$$

Wherein, Di is the depth information of an i-th target sub-object, T1 is the first moment, T2 is the second moment, c is the velocity of the electromagnetic wave; and preferably, the electromagnetic wave is the electromagnetic wave in the infrared band.

In the above-described solution, the target sub-object refers to a position in the projecting plane. The first multimedia data may be the picture data, the video data or the audio video data or the like.

Step 202: averaging the N depth sub-information to obtain the depth information of the target object.

In consideration of practical situation in the present embodiment, there may occur a status of uneven in the target object. Therefore, the present embodiment acquires N depth sub-information of the N target sub-objects respectively and averages the N depth sub-information, to obtain the depth information of the target object. Thus, interference brought by the uneven of the target object is avoided.

Step 203: calculating the second parameter of the projecting unit according to the depth information of the target object and the first parameter of the projecting unit.

Here, the first parameter of the projecting unit includes two sub-parameters, which are the focal length of the projecting unit and the size of the projecting unit.

In the present embodiment, the second parameter of the projecting unit can be calculated based on acquired information such as the depth information of the target object, the focal length of the projecting unit, the size of the projecting unit or the like; the second parameter refers to the distance and direction by which the projecting unit should move when the projecting unit projects the first display picture of the first multimedia data on the target object.

Step 204: moving the projecting unit to a first position based on the second parameter of the projecting unit to make the projecting unit project the first display picture of the first multimedia data.

Subsequent to step 203, the projecting unit is moved to the first position based on the distance and the direction by which the projecting unit should move, the first position refers to the position of the first display picture of the first multimedia data projected on the target object by the projecting unit; here, the first display picture is the most clear picture of the first multimedia data displayed on the target object.

Preferably, the projecting unit may be moved to the first position by the step motor connected to the projecting unit, thus, accuracy of the movement of the projecting unit can be improved.

With the above-described technical solution of the embodiments of the present invention, fast and accurate focusing of the electronic apparatus is implemented, so as to make the first multimedia data which is most clear to be presented on the target object, it save a lot of time to execute the focusing manually, and improves the efficiency of the projection representation, which improves the user's experience.

Figure 3:
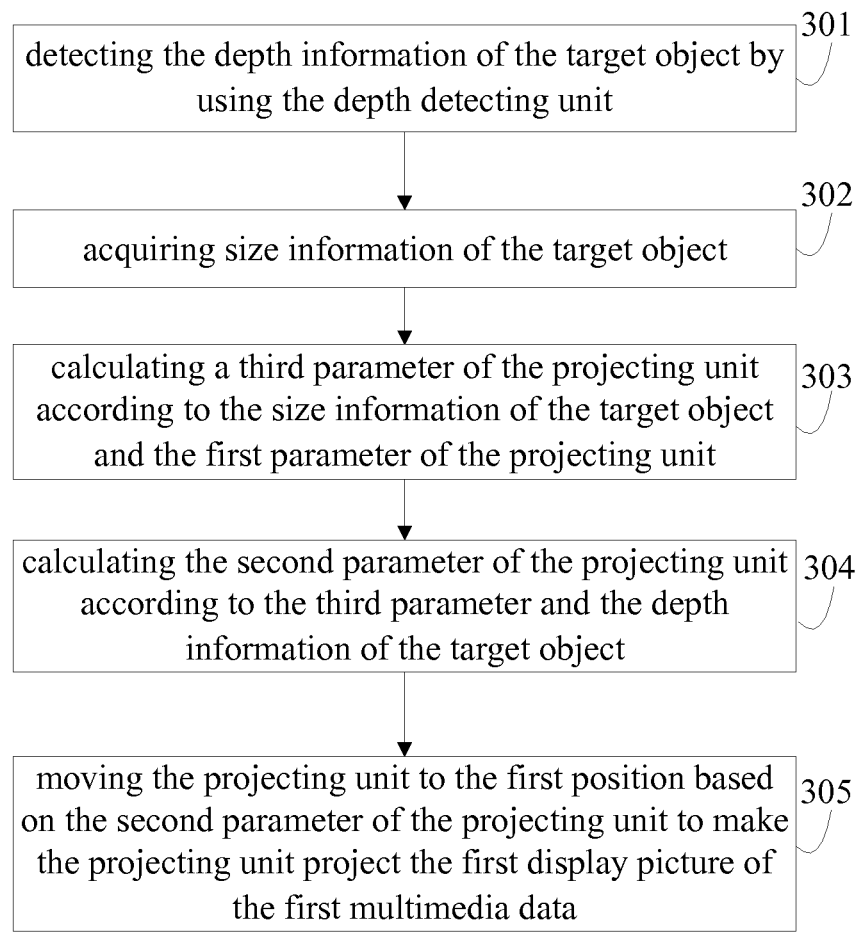
FIG. 3 is a schematic diagram of flow of a control method of the third embodiment of the present invention.

FIG. 3 is a schematic diagram of flow of a control method of the third embodiment of the present invention, and the control method in this example is applied in the electronic apparatus including the projecting another and the depth detecting another; the projecting another is able to project the first multimedia data onto the target object; and in another preferable embodiment of the present invention, the control method includes the following steps:

Step 301: detecting the depth information of the target object by using the depth detecting unit.

In specific implementation, the electronic apparatus may be the projector, and may also be the terminal provided with the projecting apparatus. The projecting unit in the electronic apparatus is the projecting lens having the projecting function, i.e., the optical lens, and the performance of the projecting lens is characterized by two important parameters, which are the focal length of the projecting lens and the size of the projecting lens. The depth detecting unit in the electronic apparatus is the depth detecting device having the depth detecting function, and this device can obtain the depth information of the target object by the manners including but not limited to the following:

Transmitting electromagnetic wave to the target object and recording current moment as the first moment; receiving the electromagnetic wave returned by the target object and recording current moment as the second moment; and calculating the depth information of the target object according to the time interval between the first moment and the second moment and the velocity of transmission of the electromagnetic wave.

In the above-described solution, acquiring the depth information of the target object may also be obtained through a formula (1c):

$$D = \frac{(T2 - T1) \times c}{2} \quad (1c)$$

Wherein, D is the depth information of the target object, T1 is the first moment, T2 is the second moment, c is the velocity of the electromagnetic wave; and preferably, the electromagnetic wave is the electromagnetic wave in the infrared band.

In the above-described solution, the target object refers to the projecting plane. The first multimedia data may be the picture data, the video data or the audio video data or the like.

Step 302: acquiring size information of the target object.

Generally, the target object is a two dimensional projecting plane, the projecting plane has a certain area, i.e., size, and in order to calculate the second parameter of the projecting unit, the size information of the target object needs to be acquired first.

The size information of the target object may be set in the electronic apparatus in advance, thus, the size information of the target object can be read directly, generally, the size information of the target object is measured in units of inches.

Step 303: calculating a third parameter of the projecting unit according to the size information of the target object and the first parameter of the projecting unit.

Here, the third parameter characterizes the distance between the projecting unit and the target object.

Here, the first parameter of the projecting unit includes two sub-parameters, which are the focal length of the projecting unit and the size of the projecting unit.

In particular, the third parameter of the projecting unit can be calculated through a formula (2c):

$$H = \frac{F \times S1}{S2} \quad (2c)$$

Wherein, H is the third parameter of the projecting unit, F is the focal length of the projecting unit, S1 is size of the target object, and S2 is size of the projecting unit.

Here, when the first display picture of the first multimedia data is presented on the target object, the distance between the projecting unit and the target object is H.

Step 304: calculating the second parameter of the projecting unit according to the third parameter and the depth information of the target object.

Here, the second parameter characterizes the distance and direction to be moved of the projecting unit, that is, the second parameter refers to the distance and the direction by which the projecting unit should move when the projecting unit projects the first display picture of the first multimedia data on the target object.

Step 305: moving the projecting unit to the first position based on the second parameter of the projecting unit to make the projecting unit project the first display picture of the first multimedia data.

Subsequent to step 304, the projecting unit is moved to the first position based on the distance and the direction by which the projecting unit should move, the first position refers to the position of the first display picture of the first multimedia data projected on the target object by the projecting unit; here, the first display picture is the most clear picture of the first multimedia data displayed on the target object.

Preferably, the projecting unit may be moved to the first position by the step motor connected to the projecting unit, thus, the accuracy of the movement of the projecting unit can be improved.

With the above-described technical solution of the embodiments of the present invention, fast and accurate focusing of the electronic apparatus is implemented, so as to make the first multimedia data which is most clear to be presented on the target object, it save a lot of time to execute the focusing manually, and improves the efficiency of the projection representation, which improves the user's experience.

Figure 4:
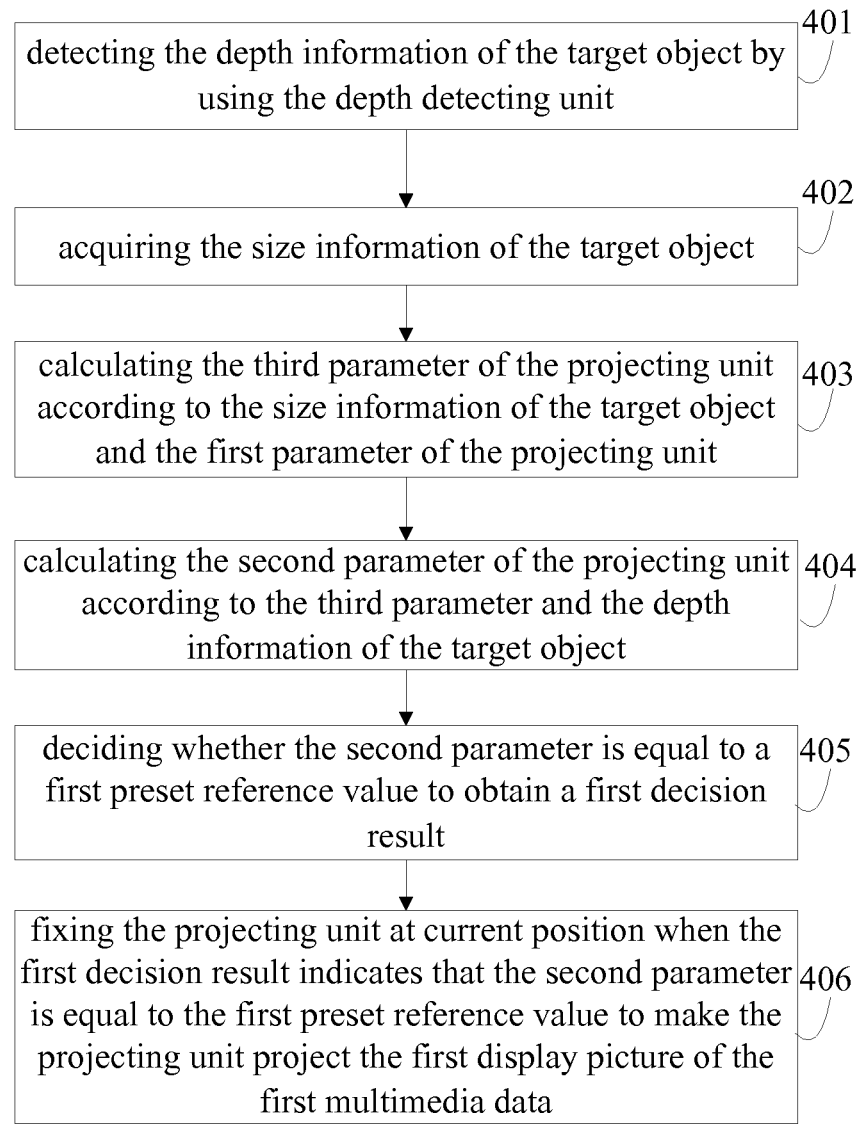
FIG. 4 is a schematic diagram of flow of a control method of the fourth embodiment of the present invention.

FIG. 4 is a schematic diagram of flow of a control method of the fourth embodiment of the present invention, and the control method in this example is applied in the electronic apparatus including the projecting unit and the depth detecting unit; the projecting unit is able to project the first multimedia data onto the target object; and in another preferable embodiment of the present invention, the control method includes the following steps:

Step 401: detecting the depth information of the target object by using the depth detecting unit.

In specific implementation, the electronic apparatus may be the projector, and may also be the terminal provided with the projecting apparatus. The projecting unit in the electronic apparatus is the projecting lens having the projecting function, i.e., the optical lens, and the performance of the projecting lens is characterized by two important parameters, which are the focal length of the projecting lens and the size of the projecting lens. The depth detecting unit in the electronic apparatus is the depth detecting device having the depth detecting function, and this device can obtain the depth information of the target object by the manners including but not limited to the following:

Transmitting the electromagnetic wave to the target object and recording current moment as the first moment; receiving the electromagnetic wave returned by the target object and recording current moment as the second moment; and calculating the depth information of the target object according to the time interval between the first moment and the second moment and the velocity of transmission of the electromagnetic wave.

In the above-described solution, acquiring the depth information of the target object may also be obtained through a formula (1d):

$$D = \frac{(T2 - T1) \times c}{2} \quad (1d)$$

Wherein, D is the depth information of the target object, T1 is the first moment, T2 is the second moment, c is the velocity of the electromagnetic wave; and preferably, the electromagnetic wave is the electromagnetic wave in the infrared band.

In the above-described solution, the target object refers to the projecting plane. The first multimedia data may be the picture data, the video data or the audio video data or the like.

Step 402: acquiring the size information of the target object.

Generally, the target object is the two dimensional projecting plane, the projecting plane has a certain area, i.e., size, and in order to calculate the second parameter of the projecting unit, the size information of the target object needs to be acquired first.

The size information of the target object may be set in the electronic apparatus in advance, thus, the size information of the target object can be read directly, generally, the size information of the target object is measured in units of inches.

Step 403: calculating the third parameter of the projecting unit according to the size information of the target object and the first parameter of the projecting unit.

Here, the third parameter characterizes the distance between the projecting unit and the target object.

Here, the first parameter of the projecting unit includes two sub-parameters, which are the focal length of the projecting unit and the size of the projecting unit.

In particular, the third parameter of the projecting unit can be calculated through a formula (2d):

$$H = \frac{F \times S1}{S2} \quad (2d)$$

Wherein, H is the third parameter of the projecting unit, F is the focal length of the projecting unit, S1 is the size of the target object, and S2 is the size of the projecting unit.

Here, when the first display picture of the first multimedia data is presented on the target object, the distance between the projecting unit and the target object is H.

Step 404: calculating the second parameter of the projecting unit according to the third parameter and the depth information of the target object.

Here, the second parameter characterizes the distance and the direction to be moved of the projecting unit, that is, the second parameter refers to the distance and the direction by which the projecting unit should move when the projecting unit projects the first display picture of the first multimedia data on the target object.

In particular, the second parameter may be calculated through a formula (3d):

$$\Delta = H - D \quad (3d)$$

Wherein, $\Delta$ is the second parameter, H is the third parameter, and D is the depth information of the target object.

Step 405: deciding whether the second parameter is equal to a first preset reference value to obtain a first decision result.

In default case, the first preset reference value is set as 0.

Step 406: fixing the projecting unit at current position when the first decision result indicates that the second parameter is equal to the first preset reference value to make the projecting unit project the first display picture of the first multimedia data.

Here, the first display picture is the most clear picture of the first multimedia data displayed on the target object.

Subsequent to step 405, when the second parameter is equal to 0, it indicates that the third parameter is equal to the depth information of the target object, thus, a clear display picture can be projected at the current position of the projecting unit.

With the above-described technical solution of the embodiments of the present invention, fast and accurate focusing of the electronic apparatus is implemented, so as to make the first multimedia data which is most clear to be presented on the target object, it save a lot of time to execute the focusing manually, and improves the efficiency of the projection representation, which improves the user's experience.

Figure 5:
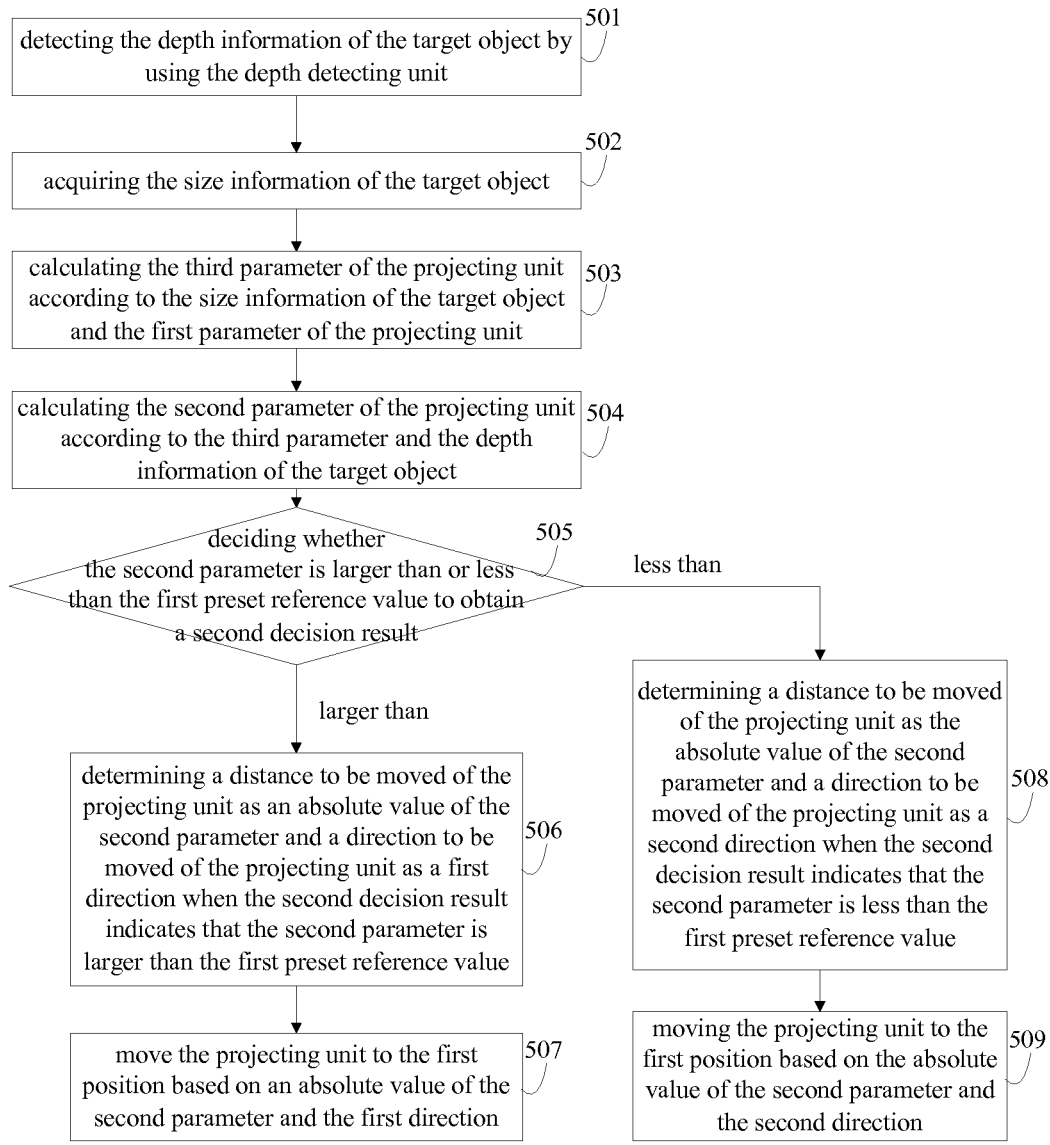
FIG. 5 is a schematic diagram of flow of a control method of the fifth embodiment of the present invention.

FIG. 5 is a schematic diagram of flow of a control method of the fifth embodiment of the present invention, and the control method in this example is applied in the electronic apparatus including the projecting unit and the depth detecting unit; the projecting another is able to project the first multimedia data onto the target object; and in another preferable embodiment of the present invention, the control method includes the following steps:

Step 501: detecting the depth information of the target object by using the depth detecting unit.

In specific implementation, the electronic apparatus may be the projector, and may also be the terminal provided with the projecting apparatus. The projecting unit in the electronic apparatus is the projecting lens having the projecting function, i.e., the optical lens, and the performance of the projecting lens is characterized by two important parameters, which are the focal length of the projecting lens and the size of the projecting lens. The depth detecting unit in the electronic apparatus is the depth detecting device having the depth detecting function, and this device can obtain the depth information of the target object by the manners including but not limited to the following:

Transmitting the electromagnetic wave to the target object and recording current moment as the first moment; receiving the electromagnetic wave returned by the target object and recording current moment as the second moment; and calculating the depth information of the target object according to the time interval between the first moment and the second moment and the velocity of transmission of the electromagnetic wave.

In the above-described solution, acquiring the depth information of the target object may also be obtained through a formula (1e):

$$D = \frac{(T2 - T1) \times c}{2} \quad (1e)$$

Wherein, D is the depth information of the target object, T1 is the first moment, T2 is the second moment, c is the velocity of the electromagnetic wave; and preferably, the electromagnetic wave is the electromagnetic wave in the infrared band.

In the above-described solution, the target object refers to the projecting plane. The first multimedia data may be the picture data, the video data or the audio video data or the like.

Step 502: acquiring the size information of the target object.

Generally, the target object is the two dimensional projecting plane, the projecting plane has a certain area, i.e., size, and in order to calculate the second parameter of the projecting unit, the size information of the target object needs to be acquired first.

The size information of the target object may be set in the electronic apparatus in advance, thus, the size information of the target object can be read directly, generally, the size information of the target object is measured in units of inches.

Step 503: calculating the third parameter of the projecting unit according to the size information of the target object and the first parameter of the projecting unit.

Here, the third parameter characterizes the distance between the projecting unit and the target object.

Here, the first parameter of the projecting unit includes two sub-parameters, which are the focal length of the projecting unit and the size of the projecting unit.

In particular, the third parameter of the projecting unit can be calculated through a formula (2e):

$$H = \frac{F \times S1}{S2} \quad (2e)$$

Wherein, H is the third parameter of the projecting unit, F is the focal length of the projecting unit, S1 is the size of the target object, and S2 is the size of the projecting unit.

Here, when the first display picture of the first multimedia data is presented on the target object, the distance between the projecting unit and the target object is H.

Step 504: calculating the second parameter of the projecting unit according to the third parameter and the depth information of the target object.

Here, the second parameter characterizes the distance and the direction to be moved of the projecting unit, that is, the second parameter refers to the distance and the direction by which the projecting unit should move when the projecting unit projects the first display picture of the first multimedia data on the target object.

In particular, the second parameter may be calculated through a formula (3e):

$$\Delta = H - D \quad (3e)$$

Wherein, $\Delta$ is the second parameter, H is the third parameter, and D is the depth information of the target object.

Step 505: deciding whether the second parameter is larger than or less than the first preset reference value to obtain a second decision result; step 506 or step 508 is executed.

In default case, the first preset reference value is set as 0.

Step 506: determining a distance to be moved of the projecting unit as an absolute value of the second parameter and a direction to be moved of the projecting unit as a first direction when the second decision result indicates that the second parameter is larger than the first preset reference value.

Here, when the second parameter is larger than the first preset reference value, it indicates that the third parameter is larger than the depth information of the target object, therefore, the first direction is a direction away from the target object.

Step 507: moving the projecting unit to the first position based on an absolute value of the second parameter and the first direction; and terminating this flow.

In particular, the projecting unit is moved along the direction away from the target object by a distance of the absolute value of the second parameter.

Step 508: determining a distance to be moved of the projecting unit as the absolute value of the second parameter and a direction to be moved of the projecting unit as a second direction when the second decision result indicates that the second parameter is less than the first preset reference value.

Here, the second direction is opposite to the first direction.

Here, when the second parameter is less than the first preset reference value, it indicates that the third parameter is less than the depth information of the target object, therefore, the second direction is a direction closer to the target object.

Step 509: moving the projecting unit to the first position based on the absolute value of the second parameter and the second direction.

In particular, the projecting unit is moved along the direction closer to the target object by the distance of the absolute value of the second parameter.

Here, the first display picture is the most clear picture of the first multimedia data displayed on the target object.

Preferably, the projecting unit may be moved to the first position by the step motor connected to the projecting unit, thus, the accuracy of the movement of the projecting unit can be improved.

With the above-described technical solution of the embodiments of the present invention, fast and accurate focusing of the electronic apparatus is implemented, so as to make the first multimedia data which is most clear to be presented on the target object, it save a lot of time to execute the focusing manually, and improves the efficiency of the projection representation, which improves the user's experience.

Figure 6:
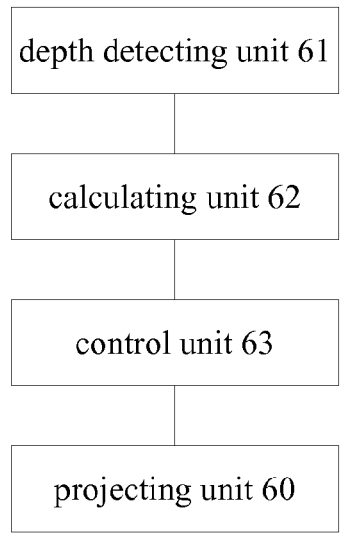
FIG. 6 is a schematic diagram of structural composition of an electronic apparatus of the first embodiment of the present invention.

FIG. 6 is a schematic diagram of structural composition of an electronic apparatus of the first embodiment of the present invention, the electronic apparatus in this example includes a projecting unit 60 which is able to project first multimedia data onto a target object; in one preferable embodiment of the present invention, the electronic apparatus further includes: a depth detecting unit 61, a calculating unit 62, a control unit 63; wherein, The depth detecting unit 61 is for detecting depth information of the target object;

The calculating unit 62 is for calculating second parameter of the projecting unit 60 according to depth information of the target object and first parameter of the projecting unit 60;

The control unit 63 is for moving the projecting unit 60 to a first position based on the second parameter of the projecting unit 60 to make the projecting unit 60 to project a first display picture of the first multimedia data.

Those skilled in the art should understand that, functions implemented by respective units in the electronic apparatus as shown in FIG. 6 can be understood with reference to previous related description of the control method.

Figure 7:
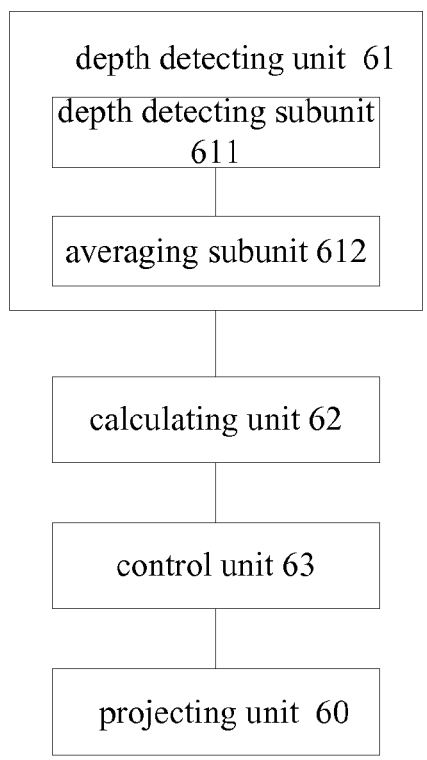
FIG. 7 is a schematic diagram of structural composition of an electronic apparatus of the second embodiment of the present invention.

FIG. 7 is a schematic diagram of structural composition of an electronic apparatus of the second embodiment of the present invention, the electronic apparatus in this example includes the projecting unit 60 which is able to project the first multimedia data onto the target object; in another preferable embodiment of the present invention, the electronic apparatus further includes: the depth detecting unit 61, the calculating unit 62, the control unit 63; wherein, The depth detecting unit 61 is for detecting the depth information of the target object;

The calculating unit 62 is for calculating the second parameter of the projecting unit 60 according to the depth information of the target object and the first parameter of the projecting unit 60; and The control unit 63 is for moving the projecting unit 60 to the first position based on the second parameter of the projecting unit 60 to make the projecting unit 60 to project the first display picture of the first multimedia data.

Preferably, the target object include N target sub-objects; N is an integer larger than 1; correspondingly, the depth detecting unit 61 includes a depth detecting subunit 611 and an averaging subunit 612; wherein, The depth detecting subunit 611 is for detecting N depth sub-information of the N target sub-objects; and The averaging subunit 612 is for averaging the N depth sub-information to obtain the depth information of the target object.

Those skilled in the art should understand that, functions implemented by respective units in the electronic apparatus as shown in FIG. 7 can be understood with reference to previous related description of the control method.

Figure 8:
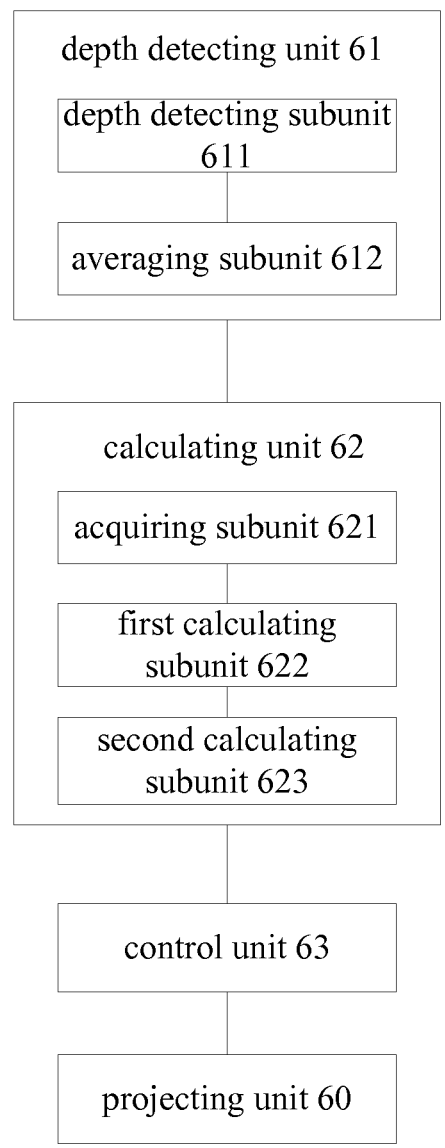
FIG. 8 is a schematic diagram of structural composition of an electronic apparatus of the third embodiment of the present invention.

FIG. 8 is a schematic diagram of structural composition of an electronic apparatus of the third embodiment of the present invention, the electronic apparatus in this example includes the projecting unit 60 which is able to project the first multimedia data onto the target object; in another preferable embodiment of the present invention, the electronic apparatus further includes: the depth detecting unit 61, the calculating unit 62, the control unit 63; wherein, The depth detecting unit 61 is for detecting the depth information of the target object;

The calculating unit 62 is for calculating the second parameter of the projecting unit 60 according to the depth information of the target object and the first parameter of the projecting unit 60; and The control unit 63 is for moving the projecting unit 60 to the first position based on the second parameter of the projecting unit 60 to make the projecting unit 60 to project the first display picture of the first multimedia data.

Preferably, the target object include N target sub-objects; N is an integer larger than 1; correspondingly, the depth detecting unit 61 includes the depth detecting subunit 611, the averaging subunit 612; wherein, The depth detecting subunit 611 is for detecting the N depth sub-information of the N target sub-objects; and The averaging subunit 612 is for averaging the N depth sub-information to obtain the depth information of the target object.

Preferably, the calculating unit 62 includes: an acquiring subunit 621, a first calculating subunit 622 and a second calculating subunit 623; wherein, The acquiring subunit 621 is for acquiring size information of the target object;

The first calculating subunit 622 is for calculating a third parameter of the projecting unit 60 according to the size information of the target object and the first parameter of the projecting unit 60; the third parameter characterizes a distance between the projecting unit 60 and the target object;

The second calculating subunit 623 is for calculating the second parameter of the projecting unit 60 according to the third parameter and the depth information of the target object; the second parameter characterizes a distance and a direction to be moved of the projecting unit 60.

Those skilled in the art should understand that, functions implemented by respective units in the electronic apparatus as shown in FIG. 8 can be understood with reference to previous related description of the control method.

Figure 9:
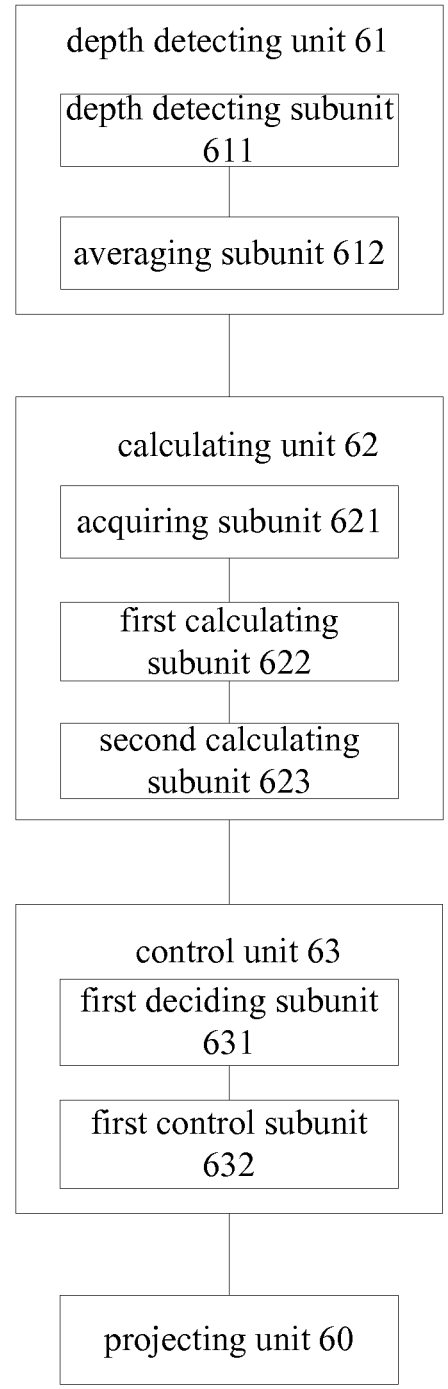
FIG. 9 is a schematic diagram of structural composition of an electronic apparatus of the fourth embodiment of the present invention.

FIG. 9 is a schematic diagram of structural composition of an electronic apparatus of the fourth embodiment of the present invention, the electronic apparatus in this example includes the projecting unit 60 which is able to project the first multimedia data onto the target object; in another preferable embodiment of the present invention, the electronic apparatus further includes: the depth detecting unit 61, the calculating unit 62, the control unit 63; wherein, The depth detecting unit 61 is for detecting the depth information of the target object;

The calculating unit 62 is for calculating the second parameter of the projecting unit 60 according to the depth information of the target object and the first parameter of the projecting unit 60; and The control unit 63 is for moving the projecting unit 60 to the first position based on the second parameter of the projecting unit 60 to make the projecting unit 60 to project the first display picture of the first multimedia data.

Preferably, the target object includes N target sub-objects; N is an integer larger than 1; correspondingly, the depth detecting unit 61 includes the depth detecting subunit 611 and the averaging subunit 612; wherein, The depth detecting subunit 611 is for detecting the N depth sub-information of the N target sub-objects; and The averaging subunit 612 is for averaging the N depth sub-information to obtain the depth information of the target object.

Preferably, the calculating unit 62 includes: the acquiring subunit 621, the first calculating subunit 622 and the second calculating subunit 623; wherein, The acquiring subunit 621 is for acquiring the size information of the target object;

The first calculating subunit 622 is for calculating the third parameter of the projecting unit 60 according to the size information of the target object and the first parameter of the projecting unit 60; the third parameter characterizes the distance between the projecting unit 60 and the target object; and The second calculating subunit 623 is for calculating the second parameter of the projecting unit 60 according to the third parameter and the depth information of the target object; the second parameter characterizes the distance and the direction to be moved of the projecting unit 60.

Preferably, the control unit 63 includes a first deciding subunit 631 and a first control subunit 632; wherein, The first deciding subunit 631 is for deciding whether the second parameter us equal to a first preset reference value to obtain a first decision result; and The first control subunit 632 is for fixing the projecting unit 60 at current position when the first decision result indicates that the second parameter is equal to the first preset reference value to make the projecting unit 60 project the first display picture of the first multimedia data.

Those skilled in the art should understand that, functions implemented by respective units in the electronic apparatus as shown in FIG. 9 can be understood with reference to previous related description of the control method.

Figure 10:
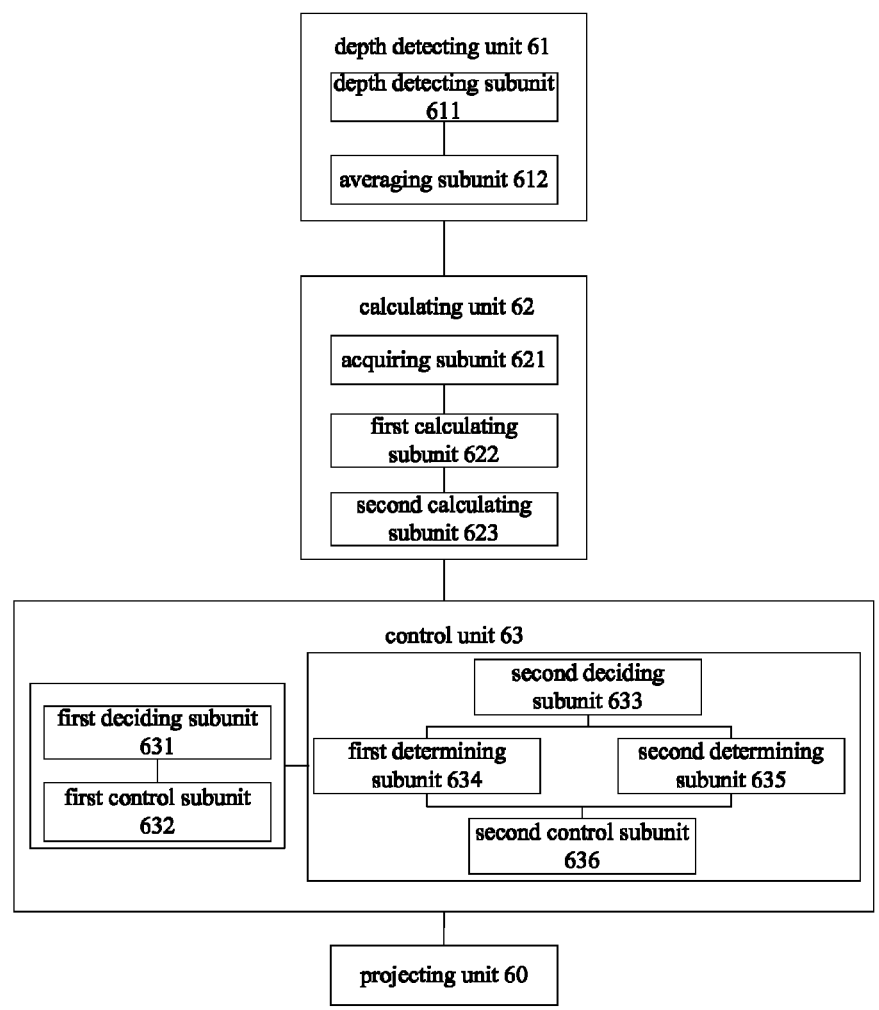
FIG. 10 is a schematic diagram of structural composition of an electronic apparatus of the fifth embodiment of the present invention.

FIG. 10 is a schematic diagram of structural composition of an electronic apparatus of the fifth embodiment of the present invention, the electronic apparatus in this example includes the projecting unit 60 which is able to project the first multimedia data onto the target object; in another preferable embodiment of the present invention, the electronic apparatus further includes: the depth detecting unit 61, the calculating unit 62 and the control unit 63; wherein, The depth detecting unit 61 is for detecting the depth information of the target object;

The calculating unit 62 is for calculating the second parameter of the projecting unit 60 according to the depth information of the target object and the first parameter of the projecting unit 60; and The control unit 63 is for moving the projecting unit 60 to the first position based on the second parameter of the projecting unit 60 to make the projecting unit 60 to project the first display picture of the first multimedia data.

Preferably, the target object includes N target sub-objects; N is an integer larger than 1; correspondingly, the depth detecting unit 61 includes the depth detecting subunit 611 and the averaging subunit 612; wherein, The depth detecting subunit 611 is for detecting the N depth sub-information of the N target sub-objects; and The averaging subunit 612 is for averaging the N depth sub-information to obtain the depth information of the target object.

Preferably, the calculating unit 62 includes: the acquiring subunit 621, the first calculating subunit 622 and the second calculating subunit 623; wherein, The acquiring subunit 621 is for acquiring the size information of the target object;

The first calculating subunit 622 is for calculating the third parameter of the projecting unit 60 according to the size information of the target object and the first parameter of the projecting unit 60; the third parameter characterizes the distance between the projecting unit 60 and the target object; and The second calculating subunit 623 is for calculating the second parameter of the projecting unit 60 according to the third parameter and the depth information of the target object; the second parameter characterizes the distance and the direction to be moved of the projecting unit 60.

Preferably, the control unit 63 includes the first deciding subunit 631, the first control subunit 632; wherein, The first deciding subunit 631 is for deciding whether the second parameter is equal to the first preset reference value to obtain the first decision result; and The first control subunit 632 is for fixing the projecting unit 60 at the current position when the first decision result indicates that the second parameter is equal to the first preset reference value to make the projecting unit 60 project the first display picture of the first multimedia data.

Preferably, the control unit 63 includes a second deciding subunit 633, a first determining subunit 634, a second determining subunit 635 and a second control subunit 636; wherein, The second deciding subunit 633 is for deciding whether the second parameter is larger than or less than the first preset reference value to obtain a second decision result;

The first determining subunit 634 is for determining the distance to be moved of the projecting unit 60 as an absolute value of the second parameter and direction to be moved of the projecting unit 60 as a first direction when the second decision result indicates that the second parameter is larger than the first preset reference value; correspondingly The second control subunit 636 is for moving the projecting unit 60 to the first position based on the absolute value of the second parameter and the first direction;

The second determining subunit 635 is for determining the distance to be moved of the projecting unit 60 as the absolute value of the second parameter and the direction to be moved of the projecting unit 60 as a second direction when the second decision result indicates that the second parameter is less than the first preset reference value; the second direction is opposite to the first direction; correspondingly, The second control subunit 636 is for moving the projecting unit 60 to the first position based on the absolute value of the second parameter and the second direction.

Those skilled in the art should understand that, functions implemented by respective units in the electronic apparatus as shown in FIG. 10 can be understood with reference to previous related description of the control method.

A smart terminal such as a mobile telephone, a tablet computer has obtained favor of a user due to portability and diversified processing capacity so as to obtain fast development. Functions of the smart terminal are increased gradually, for example, a camera module, a recording module, a radio module or the like is added, so as to be able to take photo, record audio, listen to broadcast or the like by using the smart terminal. In procedure of using the respective modules, there are different parameters to be adjusted. For example, at the time of taking photo, focal distance needs to be adjusted, and at the time of listening to broadcast, volume needs to be adjusted, and so on.

Hereinafter, conventional manner of adjusting parameters is explained by taking adjustment of the focal length of the camera as example. One manner of adjusting the focal length is adjusting the focal length by adopting a mechanical mode, it installs a mechanical device such as an adjusting gear to a case of the smart terminal, and the focal length is adjusted by adjusting the gear manually by the user. The mechanical device would cause increase of hardware, which influences appearance of the smart terminal, and is inconvenient for operation of the user. Another manner of adjusting the focal length is adjusting the focal length by adopting a mode of software control, it is mainly developing an application for the camera module of the smart terminal, and a progress adjusting slider is provided in the application to adjust the focal length. At this time, software program for adjusting the focal length must be found accurately through a display screen, and position of the slider must be found accurately, which increases difficulty of control, and consumes electric power of the smart terminal correspondingly.

Therefore, it is desirable to provide a simple way to adjust the parameters of the respective modules in the smart terminal so as to improve use experience of the user.

The embodiments of the present invention provide a method for adjusting predetermined parameter, an adjusting device and an electronic apparatus including the adjusting device, and they are able to adjust parameters of specific module in the smart terminal in a simple way so as to improve the use experience of the user.

On one aspect, there provides a method for adjusting predetermined parameter of an electronic apparatus including a touch screen and a predetermined module having the predetermined parameter, the method may include: detecting status of the touch screen at the time of initiating the predetermined module; enabling an operation sensing function of the touch screen when the status of the touch screen indicates that the operation sensing function of the touch screen is not turned on; acquiring an operation action on the entire touch screen of the user; and adjusting the predetermined parameter of the predetermined module according to the acquired operation action so that the electronic apparatus operates according to the adjusted predetermined parameter.

In the method for adjusting the predetermined parameter, enabling the operation sensing function of the touch screen may include: enabling the operation sensing function of the touch screen in case that a display function of the touch screen is not turned on.

In the method for adjusting predetermined parameter, it may further include: determining whether the operation action is processed by other modules of the electronic apparatus other than the predetermined module in predetermined time period after the operation action on the touch screen of the user is acquired when the status of the touch screen indicates that the operation sensing function of the touch screen is turned on; wherein, adjusting the predetermined parameter of the predetermined module according to the acquired operation action may be executed when it determines that the operation action is not processed by other modules in the predetermined time period.

In the method for adjusting predetermined parameter, the predetermined module may be a projecting module in the electronic apparatus, and predetermined parameter may be focal length of projection of the projective module.

In the method for adjusting predetermined parameter, adjusting the predetermined parameter of the predetermined module according to the acquired operation action may include: determining an operation direction of the acquired operation action; determining direction of change of the focal length of projection according to the acquired operation direction.

In the method for adjusting predetermined parameter, the predetermined module may include at least two working modes, adjusting the predetermined parameter of the predetermined module according to the acquired operation action may include: determining the working mode of the predetermined module; establishing correspondence relationship between the operation action and the predetermined parameter based on the working mode; and adjusting the predetermined parameter of the predetermined module according to the acquired operation action based on the correspondence relationship.

On another aspect, there provides an adjusting device for an electronic apparatus including a touch screen and a predetermined module having adjustable predetermined parameter, the adjusting device may include: a detecting unit for detecting a status of the touch screen at the time of initiating the predetermined module; an enabling unit for enabling an operation sensing function of the touch screen when the status of the touch screen detected by the detecting unit indicates that the operation sensing function of the touch screen is not turned on; an acquiring unit for acquiring the operation action on the entire touch screen of the user; and an adjusting unit for adjusting the predetermined parameter of the predetermined module according to the acquired operation action so that an electronic apparatus operates according to the adjusted predetermined parameter.

In the adjusting device, when the status of the touch screen indicates that the operation sensing function of the touch screen is not turned on, the enabling unit may enable the operation sensing function of the touch screen in case that a display function of the touch screen is not turned on.

In the adjusting device, the electronic apparatus may further include additional modules, the adjusting device further include a determining unit, and the determining unit may determine whether the operation action is processed by the additional modules of the electronic apparatus in the predetermined time period after the operation action on the touch screen of the user is acquired by the acquiring unit when the status of the touch screen detected by the detecting unit indicates that the operation sensing function of the touch screen is turned on.

When the determining unit determines that the operation action is not processed by the additional modules in the predetermined time period, the adjusting unit may adjust the predetermined parameter of the predetermined module according to the acquired operation action.

In the adjusting device, the predetermined module may be a projecting module in the electronic apparatus, and the predetermined parameter may be focal length of projection of the projective module.

In the adjusting device, the adjusting unit may adjust the predetermined parameter by the following operations: determining an operation direction of the acquired operation action; and determining direction of change of the focal length of projection according to the acquired operation direction.

In the adjusting device, the predetermined module may include at least two working modes, the adjusting unit may adjust the predetermined parameter through the following operations: determining the working mode of the predetermined module; establishing correspondence relationship between the operation action and the predetermined parameter based on the working mode; and adjusting the predetermined parameter of the predetermined module according to the acquired operation action based on the correspondence relationship.

On still another aspect, there provides an electronic apparatus including a touch screen; a predetermined module having adjustable predetermined parameter; and an adjusting device as mentioned above.

In the technical solutions of the above-described method for adjusting predetermined parameter, the adjusting device and the electronic apparatus including the adjusting device of the embodiments of the present invention, by adjusting the predetermined parameter of the predetermined module according to the operation action on the entire touch screen by the user, it is able to adjust the parameter of the specific module in the smart terminal in a simple way, so as to improve the use experience of the user.

Hereinafter, a method for adjusting predetermined parameter, an adjusting device and an electronic apparatus including the adjusting device according to the sixth embodiment of the present invention are described with reference to FIGS. 11 to 14.

FIG. 11 is a flow chart illustrating first method for adjusting predetermined parameter 700 according to the sixth embodiment of the present invention schematically. The electronic apparatus to which the first method for adjusting predetermined parameter 700 is applied is for example a mobile phone, a music player, a PDA, a computer or the like. As shown in FIG. 11.1 the electronic apparatus 70 includes a touch screen 701 and a predetermined module 702, and the predetermined module 702 has predetermined parameter to be adjusted.

The predetermined parameter may be any parameter needed to be adjusted. For example, in case that the electronic apparatus is a camera, the predetermined module 702 may be an optical imaging module in the camera, and the predetermined parameter may be focal length of the optical imaging module. In case that the electronic apparatus 70 is the music player, the predetermined module 702 may be an audio playing module in the music player, and the predetermined parameter 702 may be volume of the audio playing module. In case that the electronic apparatus includes a projecting module, the predetermined module may be the projecting module in the electronic apparatus, and the predetermined parameter may be focal length of projection of the projective module.

As shown in FIG. 11, the first method for adjusting predetermined parameter 700 for the electronic apparatus may include: detecting the status of the touch screen 701 at the time of initiating the predetermined module (S710); enabling an operation sensing function of the touch screen 701 when the status of the touch screen 701 indicates that the operation sensing function of the touch screen 701 is not turned on (S720); acquiring the operation action on the entire touch screen 701 of the user (S730); and adjusting the predetermined parameter of the predetermined module 702 according to the acquired operation action so that an electronic apparatus operates according to the adjusted predetermined parameter (S740).

In S710, at the time of initiating the predetermined module 702 in the electronic apparatus, the status of the touch screen is detected. The predetermined module 702 has the predetermined parameter to be adjusted. Therefore, when the predetermined module 702 is initiated, it means that the predetermined parameter of the predetermined module 702 is to be adjusted, so that adjustment of the predetermined parameter is started. Initiation of other modules in the electronic apparatus other than the predetermined module 702 may not initiate the application of the present invention, for example, in case that the electronic apparatus 70 is a mobile phone including the camera, initiation of a communication function in the mobile phone is not able to start adjustment of the parameter of the camera therein.

The touch screen 701 is an inductive type LCD device which can receive signal inputted by stylus, finger of the user or the like, and it not only has a display function, but also has an operation sensing function for sensing an input of the user. The operation sensing function of the touch screen 701 facilitate input of instruction of the user greatly, so as to be convenient for control by the user. Generally, in order to save power consumption, the touch screen 701 is turned off when it is unnecessary to use the touch screen 701 to display or sense operation of the user, for example, in procedure of making phone call of the mobile phone. After predetermined time after communication starts, the touch screen 701 is turned off automatically, and a specific press key in the mobile phone is needed to be operated to turn on the touch screen 701. Further, in case of adjusting the volume by using a mechanical press key in the conventional mobile phone, the touch screen 701 of the mobile phone may also not be turned on. That is, since other additional modules are included in the electronic apparatus other than the predetermined module 702 and initiation of the respective modules does not have positive connection with the initiation of the touch screen 701. Therefore, at the time of initiating the predetermined module 702, the status of the touch screen 701 is detected to ensure that it is able to use the touch screen 701 to adjust. The status of the touch screen 701 refers to whether the operation sensing function of the touch screen 701 is turned on, whether the display function of the touch screen 701 is turned on, and so on.

In S720, when the status of the touch screen indicates that the operation sensing function of the touch screen is not turned on, the operation sensing function of the touch screen is enabled. When the status of the touch screen indicates that the operation sensing function of the touch screen has already turned on, operation of enabling the operation sensing function of the touch screen is unnecessary to be executed. Step S720 is to ensure that the operation sensing function of the touch screen is turned on, so that action of instruction of the user can be sensed by the touch screen in step S730.

In S720, the operation sensing function of the touch screen 701 may be enabled in case that the display function of the touch screen 701 is not turned on. In conventional usage of the touch screen 701, the display function of the touch screen 701 is used in combination with the operation sensing function thereof. That is, when the touch screen 701 is turned on, both of the display function and the operation sensing function thereof are turned on; and when the touch screen 701 is turned off, both of the display function and the operation sensing function thereof are turned off. However, in implementation of the embodiments of the present invention, the display function of the touch screen 701 may be turned off and only the operation sensing function of the touch screen 701 is turned on, that is, operation of adjustment can be executed in case that the display is off, which can not only save the power consumption, but also distinguish from operations of other functional modules in the electronic apparatus which need the touch screen 701 to assist to display.

After ensuring that the operation sensing function of the touch screen 701 is turned on in S720, the operation action on the entire touch screen 701 of the user is acquired in S730. Since the operation sensing function of the touch screen 701 is turned on, the user can make the operation action on the touch screen 701, that is, take the touch screen 701 as an input unit of the predetermined module. The operation action on the entire touch screen 701 of the user can be sensed and used for the adjustment of the predetermined parameter, which reduce requirement of accuracy of the operation of the user greatly.

For example, in the conventional operation of adjusting the volume of the electronic apparatus, the user needs to point his finger to a slider for audio adjustment accurately, and the slider only occupies a very small area of the touch screen 701 generally, and then the adjustment of the volume can be implemented by sliding the slider on a sliding bar where the slider is. However, if the volume is adjusted by using the technical solution of the present invention, the user only needs to carry out sliding operations in different directions on the touch screen 701, for example, sliding from left to right by the finger to increase the volume and sliding from right to left to decrease the volume, the finger of the user does not need to point to a certain region accurately, and direction of sliding thereof is not limited to the sliding bar where the slider is. As to decision of the direction of sliding, for example, not only respective parallel rightwards sliding on the touch screen 701 is decided as operation of direction of rightwards, a sliding rightwards obliquely within a range of ±40° (or ±30°, ±20° or the like) of the sliding rightwards can also be decided as the operation of direction of rightwards, correspondingly, requirement of accuracy of the operation of the user is reduced greatly.

The acquired operation action in S730 may be a sliding in a specific direction, a sliding of a specific velocity, a sliding of two fingers of same direction, a sliding of two fingers of reverse direction, and so on. Any action taken on the touch screen 701 by the user may be as the operation action of executing the adjustment.

In S740, the predetermined parameter of the predetermined module 702 is adjusted according to the acquired operation action so that an electronic apparatus operates according to the adjusted predetermined parameter.

As an example, in case that the predetermined module 702 is the projecting module in the electronic apparatus 70 and the predetermined parameter is the focal length of projection of the projecting module, adjusting the predetermined parameter of the predetermined module 702 according to the acquired operation action may include: determining an operation direction of the acquired operation action; and determining direction of change of the focal length of projection according to the acquired operation direction.

In particular, when the acquired operation direction indicates that the finger of the user slides from top to bottom on the touch screen 701, the focal length of projection is made to become closer; and when the acquired operation direction indicates that the finger of the user slides from bottom to top on the touch screen 701, the focal length of projection is made to become farther. Further, in S740, it may also include: determining velocity of operation of the acquired operation action; and determining magnitude of change of the focal length of projection according to the acquired velocity of operation.

Alternatively, magnitude of change of the focal length of projection can also be determined by using distance of the sliding operation. That is, direction of change and the magnitude of change of the focal length of projection are controlled according to direction and velocity (or distance) of the operation action of the user respectively.

As another example, in case that the predetermined module 702 is the audio playing module in the electronic apparatus and the predetermined parameter is the volume of the audio playing module, adjusting the predetermined parameter of the predetermined module 702 according to the acquired operation action may include: determining an operation direction and an operation distance of the acquired operation action; and determining direction of change (i.e., becoming larger or becoming smaller) and magnitude of change of the volume are determined according to the acquired operation direction and operation distance.

At this time, the volume may be made to become larger when the acquired operation direction indicates that the finger of the user slides from left to right on the touch screen 701; and the volume may be made to become smaller when the acquired operation direction indicates that the finger of the user slides from right to left the touch screen, and magnitude of change of the volume is controlled according to distance or velocity of slide of the finger in the direction of sliding.

Further, in case that the predetermined module 702 include at least two working modes, adjusting the predetermined parameter of the predetermined module 702 according to the acquired operation action may include: determining the working mode of the predetermined module 702; establishing correspondence relationship between the operation action and the predetermined parameter based on the working mode; and adjusting the predetermined parameter of the predetermined module 702 according to the acquired operation action based on the correspondence relationship.

For example, if the projecting module in the electronic apparatus can rotate a projected picture and has two projecting modes of transverse projection and vertical projection correspondingly, an operation in a first operational direction can be set to be able to adjust projection distance of the projecting module in the mode of transverse projection; and an operation in a second operational direction which is perpendicular to the first operational direction can be set to be able to adjust the projection distance of the projecting module in the mode of vertical projection. In practice, relationship between the operation action and the change of the predetermined parameter can be established differently with respect to different predetermined parameters or a same predetermined parameter in different modes, so as to facilitate the operation of the user.

Figure 12:
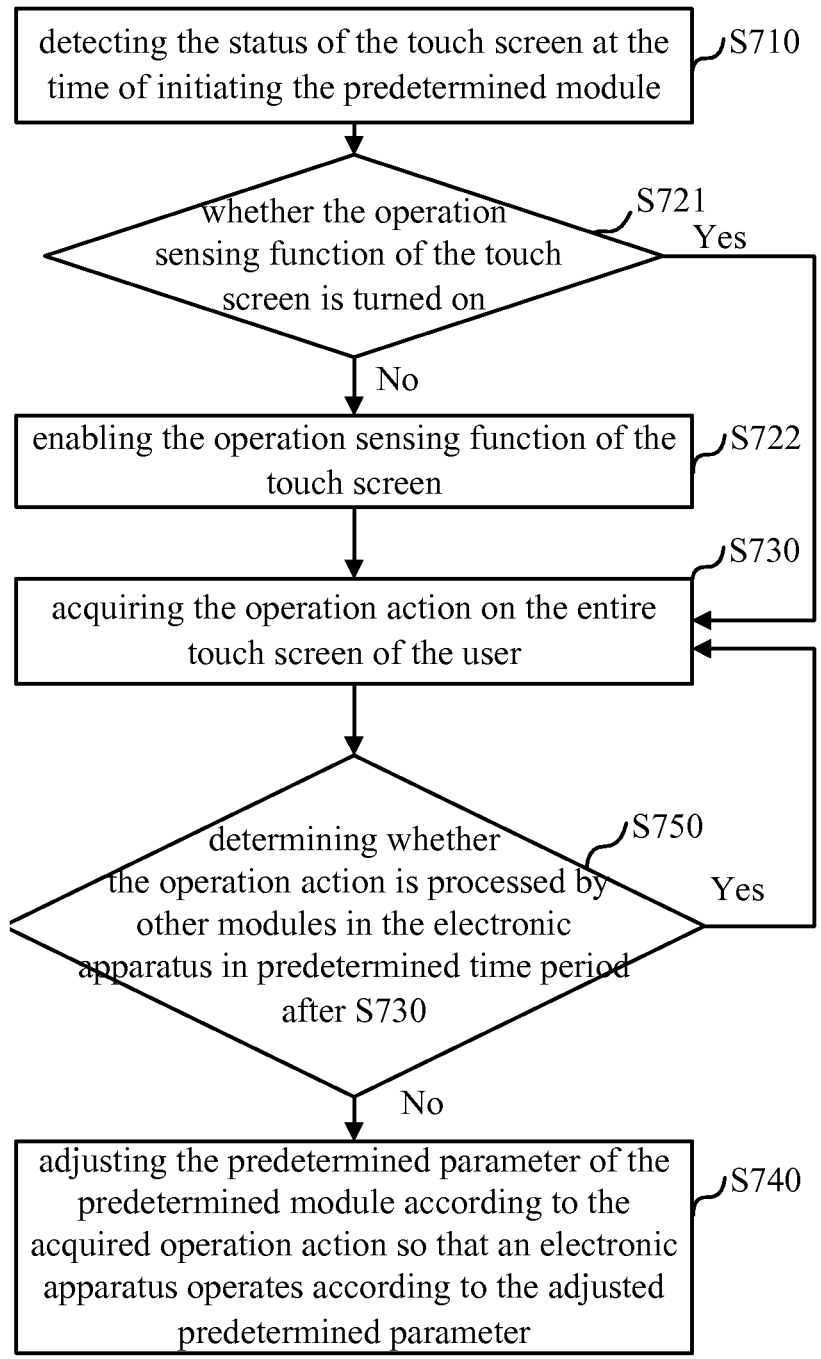
FIG. 12 is a flow chart illustrating the second method for adjusting predetermined parameter according to the sixth embodiment of the present invention schematically.

In order to further disclose the present invention, another method for adjusting predetermined parameter according to the sixth embodiment of the present invention is described in combination with FIG. 12. FIG. 12 is a flow chart illustrating second method for adjusting predetermined parameter 800 according to the sixth embodiment of the present invention schematically.

In FIG. 12, steps which are same as those in FIG. 11 adopt same reference numbers. For example, S710, S730 and S740 in FIG. 12 are same as S710, S730 and S740 in FIG. 11, and S720 in FIG. 11 is illustrated as two separated operations S721 and S722 in FIG. 12, so as to make it clearer. Whether the operation sensing function of the touch screen is turned on is decided according to the status of the touch screen detected in S710 (S721); and the operation sensing function of the touch screen is enabled (S722) when the operation sensing function of the touch screen is not turned on (No in S721). It proceeds to S730 when the operation sensing function of the touch screen is turned on.

The difference of the second method for adjusting predetermined parameter 800 in FIG. 12 with the first method for adjusting predetermined parameter 700 in FIG. 11 is in that S750 is added, that is, in predetermined time period after acquiring the operation action of the user on the touch screen (i.e., S730), determining whether the operation action is processed by other modules in the electronic apparatus than the predetermined module 702. S740 is executed when it determines that the acquired operation action is not processed by other modules (No in S750). It return to S730 when it determines that the acquired operation action is processed by other modules (Yes in S750) to continue to acquire other operations which are able to adjust the predetermined parameter.

In procedure of usage of the electronic apparatus, other modules may also be in used status at the same time of initiating the predetermined module 702, this may particularly occur in the case that the status of the touch screen detected in S721 indicates that the operation sensing function of the touch screen is turned on, other modules in the electronic apparatus may also need operations of the user on the touch screen. Therefore, in S750, the predetermined time period is waited for after the operation action of the user on the entire touch screen is acquired in S730, and whether the operation action is processed by other modules is determined; S740 is executed after there is no response to the operation action by other modules. Operations of the respective modules in the electronic apparatus are coordinated by using S750.

In practice, S750 may be omitted, if the predetermined module 702 in the electronic apparatus is always a status of priority, after the operation action on the entire touch screen by the user is acquired in S730, and S740 may be executed to respond to the operation action by the predetermined module 702 firstly. In practice, it may be selected to use as required.

In the technical solutions of the above-described method for adjusting predetermined parameter of the embodiments of the present invention, by adjusting the predetermined parameter of the predetermined module 702 according to the operation action on the entire touch screen 701 by the user, it is able to adjust the parameter of the specific module in the smart terminal in a simple way, so as to improve the use experience of the user.

Figure 13:
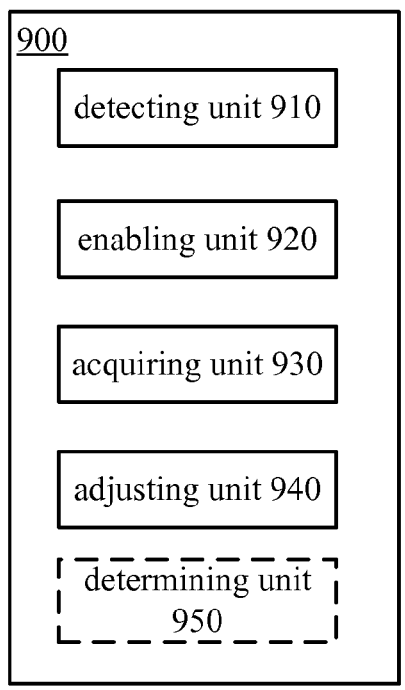
FIG. 13 is a block diagram illustrating an adjusting device according to the sixth embodiment of present invention schematically.

FIG. 13 is a block diagram illustrating an adjusting device 900 according to the sixth embodiment of present invention schematically. The electronic apparatus to which the adjusting device 900 is applied is for example the mobile phone, the music player, the PDA, the computer or the like. The electronic apparatus includes the touch screen and the predetermined module, and the predetermined module has the predetermined parameter to be adjusted. The predetermined parameter may be any parameter needed to be adjusted, for example the focal length of the optical imaging module in the camera, the volume of the audio playing module in the music player, the focal length of projection of the projecting module in the mobile phone, and so on.

As shown in FIG. 13, the adjusting device 900 may include: a detecting unit 910 for detecting the status of the touch screen at the time of initiating the predetermined module; an enabling unit 920 for enabling the operation sensing function of the touch screen when the status of the touch screen detected by the detecting unit indicates that the operation sensing function of the touch screen is not turned on; an acquiring unit 930 for acquiring the operation action on the entire touch screen of the user; and an adjusting unit 940 for adjusting the predetermined parameter of the predetermined module according to the acquired operation action so that the electronic apparatus operates according to the adjusted predetermined parameter.

The detecting unit 910 detects the status of the touch screen at the time of initiating the predetermined module in the electronic apparatus. It means that the predetermined parameter of the predetermined module is to be adjusted at the time of initiating the predetermined module. Initiation of other modules in the electronic apparatus other than the predetermined module may not initiate the application of the present invention, for example, initiation of the communication function in the mobile phone is not able to start adjustment of the parameter of the camera therein.

The operation sensing function of the touch screen facilitate input of instruction of the user greatly, so as to be convenient for control by the user. The touch screen not only has the display function, but also has the operation sensing function for sensing the input of the user. Since there is no positive connection between initiation of the respective modules in the electronic apparatus and initiation of the touch screen, therefore, the detecting unit 910 detects the status of the touch screen at the time of initiating the predetermined module to ensure adjustment can be made by using the touch screen. The status of the touch screen refers to whether the operation sensing function of the touch screen is turned on, whether the display function of the touch screen is turned on, and so on.

The enabling unit 920 enables the operation sensing function of the touch screen when the status of the touch screen detected by the detecting unit 910 indicates that the operation sensing function of the touch screen is not turned on. The enabling unit 920 is unnecessary to execute an operation of enabling the operation sensing function of the touch screen when the status of the touch screen detected by the detecting unit 910 indicates that the operation sensing function of the touch screen has already turned on.

The enabling unit 920 may enable the operation sensing function of the touch screen in case that the display function of the touch screen is not turned on. In conventional usage of the touch screen, the display function of the touch screen is used in combination with the operation sensing function thereof. That is, when the touch screen is turned on, both of the display function and the operation sensing function thereof are turned on; and when the touch screen is turned off, both of the display function and the operation sensing function thereof are turned off. However, in implementation of the embodiments of the present invention, the enabling unit 920 may turn off the display function of the touch screen and only turn on the operation sensing function of the touch screen, that is, operation of adjustment can be executed in case that the display is off, which can not only save the power consumption, but also distinguish from operations of other functional modules in the electronic apparatus which need the touch screen to assist to display.

After the enabling unit 920 ensures that the operation sensing function of the touch screen is turned on, the acquiring unit 930 acquires the operation action on the entire touch screen of the user. Since the operation sensing function of the touch screen is turned on, the user can make the operation action on the touch screen, that is, take the touch screen as an input unit of the predetermined module. The operation action on the entire touch screen of the user can be sensed and used for the adjustment of the predetermined parameter, which reduce requirement of accuracy of the operation of the user greatly.

For example, in the conventional operation of adjusting the volume of the electronic apparatus, the user needs to point his finger to a slider for audio adjustment accurately, and the slider only occupies a very small area of the touch screen generally, and then the adjustment of the volume can be implemented by sliding the slider on a sliding bar where the slider is. However, if the volume is adjusted by using the technical solution of the present invention, the user only needs to carry out sliding operations in different directions on the touch screen, for example, sliding from left to right by the finger to increase the volume and sliding from right to left to decrease the volume, the finger of the user does not need to point to a certain region accurately, and direction of sliding thereof is not limited to the sliding bar where the slider is. As to decision of the direction of sliding, for example, not only respective parallel rightwards sliding on the touch screen are decided as operation of direction of rightwards, a sliding rightwards obliquely within a range of ±40° (or ±30°, ±20° or the like) of the sliding rightwards can also be decided as the operation of direction of rightwards, correspondingly, requirement of accuracy of the operation of the user is reduced greatly.

The acquired operation action by the acquiring unit 930 may be a sliding in a specific direction, a sliding of a specific velocity, a sliding of two fingers of same direction, a sliding of two fingers of reverse direction, and so on. Any action taken on the touch screen by the user may be as the operation action of executing the adjustment.

The adjusting unit 940 adjusts the predetermined parameter of the predetermined module according to the operation action acquired by the acquiring unit 930, so that the electronic apparatus operates according to the adjusted predetermined parameter.

As an example, in case that the predetermined module is a projecting module in the electronic apparatus, and the predetermined parameter is the focal length of projection of the projecting module, the adjusting unit 940 can adjust the predetermined parameter by the following operations: determining the operation direction of the acquired operation action; determining the direction of change of the focal length of projection according to the acquired operation direction. In particular, when the acquired operation direction indicates that the finger of the user slides from top to bottom on the touch screen, the focal length of projection is made to become closer; and when the acquired operation direction indicates that the finger of the user slides from bottom to top on the touch screen, the focal length of projection is made to become farther. Further, the adjusting unit 940 may also determine velocity/distance of operation of the acquired operation action and determine magnitude of change of the focal length of projection according to the acquired velocity/distance of operation. That is, the adjusting unit 940 can control the direction of change and the magnitude of change of the focal length of projection according to direction and velocity (or distance) of the operation action of the user respectively.

Further, in case that the predetermined module includes at least two working modes, the adjusting unit 940 can adjust the predetermined parameter by the following operations: determining the working mode of the predetermined module; establishing correspondence relationship between the operation action and the predetermined parameter based on the working modes; and adjusting the predetermined parameter of the predetermined module according to the acquired operation action based on the correspondence relationship. For example, if the projecting module in the electronic apparatus can rotate a projected picture and has two projecting modes of transverse projection and vertical projection correspondingly, an operation in a first operational direction can be set to be able to adjust projection distance of the projecting module in the mode of transverse projection; and an operation in a second operational direction which is perpendicular to the first operational direction can be set to be able to adjust the projection distance of the projecting module in the mode of vertical projection. In practice, relationship between the operation action and the change of the predetermined parameter can be established differently with respect to different predetermined parameters or a same predetermined parameter in different modes, so as to facilitate the operation of the user.

Optionally, the adjusting device 900 according to the embodiments of the present invention may also include a determining unit 950 (as shown in dotted line in FIG. 13). The determining unit 950 determines whether the operation action is processed by other modules in the electronic apparatus than the predetermined module in the predetermined time period after the acquiring unit 930 acquires the operation action on the touch screen of the user. When the determining unit 950 determines that the acquired operation action is not processed by other modules, the adjusting unit 940 adjusts the predetermined parameter of the predetermined module according to the acquired operation action. When the determining unit 950 determines that the acquired operation action has already been processed by other modules, the acquiring unit 930 continues to acquire other operations which are able to adjust the predetermined parameter. In procedure of usage of the electronic apparatus, other modules may also be in used status at the same time of initiating the predetermined module, this may particularly occur in the case that the status of the touch screen detected in S721 indicates that the operation sensing function of the touch screen is turned on, other modules in the electronic apparatus may also need operations of the user on the touch screen. Operations of the respective modules in the electronic apparatus may be coordinated by using the determining unit 950.

In practice, the determining unit 950 may be omitted or not executed, if the predetermined module in the electronic apparatus is always a status of priority, after the operation action on the entire touch screen by the user is acquired by the acquiring unit 930, the adjusting unit 940 may execute the adjustment to make the predetermined module respond to the operation action firstly. In practice, it may be selected to use as required.

In the technical solutions of the above-described adjusting device of the embodiments of the present invention, by adjusting the predetermined parameter of the predetermined module according to the operation action on the entire touch screen by the user, it is able to adjust the parameter of the specific module in the smart terminal in a simple way, so as to improve the use experience of the user.

Figure 14:
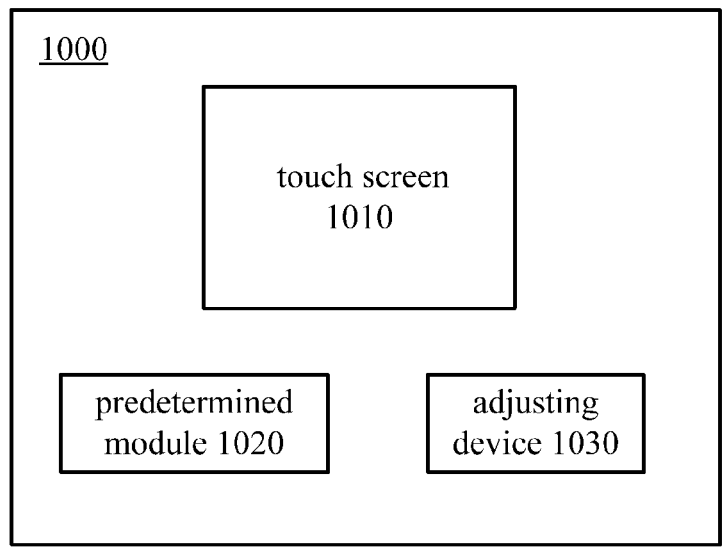
FIG. 14 is a block diagram illustrating an electronic apparatus according to the sixth embodiment of the present invention schematically.

The above-described adjusting device may be applied in any electronic apparatus, and correspondingly the electronic apparatus including the adjusting device is also within range of disclosure of the embodiments of the present invention. FIG. 14 is a block diagram illustrating an electronic apparatus 1000 according to the exemplary embodiment of the present invention schematically. As shown in FIG. 14, the electronic apparatus 1000 may include: a touch screen 1010; a predetermined module 1020 having adjustable predetermined parameter; and an adjusting device 1030 as mentioned above.

Further, the adjusting device according to the respective embodiments of the present invention may include: a storage device for storing program code; and a processor for executing the program code to implement the method for adjusting predetermined parameter described in combination with FIGS. 11 and 12.

Here, those skilled in the art can understand, the method for adjusting predetermined parameter, the adjusting device and the electronic apparatus according to the sixth embodiment of the present invention may also be used for adjusting position of the optical lens in the projector so as to execute focusing of the projector. That is, after enabling the operation sensing function of the touch screen, the second parameter of the projecting unit is adjusted through the acquired operation action on the entire touch screen of the user, the projecting unit is moved to the first position, to make the projecting unit project the first display picture of the first multimedia data.

In this case, since adjusting the parameter of the projecting unit through the operation action of the user can't definitely ensure adequate accuracy, the depth information detected by the depth detecting unit may also be assisted. That is, the second parameter of the projecting unit is adjusted roughly by the operation action on the entire touch screen of the user firstly, and then adjusted finely with the depth information of the target object detected by the depth detecting unit.

Therefore, those skilled in the art, the technical solutions according to the first embodiment to the fifth embodiment of the present invention as well as the technical solution according to the sixth embodiment of the present invention may be used separately, or may be used in combination with each other.

In case that the technical solutions according to the first embodiment to the fifth embodiment of the present invention are used separately, the control method and the electronic apparatus according to the embodiments of the present invention may be configured as follows:

(1) A control method applied in an electronic apparatus including a projecting unit and a depth detecting unit;

The projecting unit being able to project first multimedia data onto a target object;

Wherein, the method includes:

Detecting depth information of the target object by using the depth detecting unit;

Calculating second parameter of the projecting unit according to the depth information of the target object and first parameter of the projecting unit; and Moving the projecting unit to a first position based on the second parameter of the projecting unit to make the projecting unit project a first display picture of the first multimedia data.

(2) The control method according to the above (1), wherein

The target object include N target sub-objects, N is an integer larger than 1;

Correspondingly, detecting the depth information of the target object by using the depth detecting unit specifically includes:

Detecting N depth sub-information of the N target sub-objects by using the depth detecting unit; and Averaging the N depth sub-information to obtain the depth information of the target object.

(3) The control method according to the above (1) or (2), wherein

Calculating the second parameter of the projecting unit according to the depth information of the target object and the first parameter of the projecting unit specifically includes:

Acquiring size information of the target object;

Calculating a third parameter of the projecting unit according to the size information of the target object and the first parameter of the projecting unit, the third parameter characterizing a distance between the projecting unit and the target object; and Calculating the second parameter of the projecting unit according to the third parameter and the depth information of the target object, the second parameter characterizing a distance and a direction to be moved of the projecting unit.

(4) The control method according to the above (3), wherein, the method further includes:

Deciding whether the second parameter is equal to a first preset reference value to obtain a first decision result; and Fixing the projecting unit at a current position when the first decision result indicates that the second parameter is equal to the first preset reference value to make the projecting unit project the first display picture of the first multimedia data.

(5) The control method according to the above (3) or (4), wherein, the method further includes:

Deciding whether the second parameter is larger than or less than the first preset reference value to obtain a second decision result;

Determining the distance to be moved of the projecting unit as an absolute value of the second parameter and the direction to be moved of the projecting unit as a first direction when the second decision result indicates that the second parameter is larger than the first preset reference value;

Moving the projecting unit to the first position based on the absolute value of the second parameter and the first direction;

Determining the distance to be moved of the projecting unit as the absolute value of the second parameter and the direction to be moved of the projecting unit as a second direction when the second decision result indicates that the second parameter is less than the first preset reference value, the second direction being opposite to the first direction; and Moving the projecting unit to the first position based on the absolute value of the second parameter and the second direction.

(6) An electronic apparatus including a projecting unit which is able to project first multimedia data onto a target object;

Wherein, the electronic apparatus further includes a depth detecting unit, a calculating unit and a control unit; wherein, The depth detecting unit is for detecting depth information of the target object;

The calculating unit is for calculating a second parameter of the projecting unit according to depth information of the target object and a first parameter of the projecting unit; and The control unit is for moving the projecting unit to a first position based on the second parameter of the projecting unit to make the projecting unit project a first display picture of the first multimedia data.

(7) The electronic apparatus according to the above (6), wherein the target object includes N target sub-objects, N is an integer larger than 1;

Correspondingly, the depth detecting unit includes a depth detecting subunit and an averaging subunit;

Wherein,

The depth detecting subunit 611 is for detecting N depth sub-information of the N target sub-objects; and The averaging subunit is for averaging the N depth sub-information to obtain the depth information of the target object.

(8) The electronic apparatus according to the above (6) or (7), wherein

The calculating unit includes an acquiring subunit, a first calculating subunit and a second calculating subunit; wherein, The acquiring subunit is for acquiring size information of the target object;

The first calculating subunit is for calculating a third parameter of the projecting unit according to the size information of the target object and the first parameter of the projecting unit, the third parameter characterizing a distance between the projecting unit and the target object; and The second calculating subunit is for calculating a second parameter of the projecting unit according to the third parameter and the depth information of the target object, the second parameter characterizing a distance and a direction to be moved of the projecting unit.

(9) The electronic apparatus according to the above (8), wherein

The control unit include a first deciding subunit and a first control subunit; wherein, The first deciding subunit is for deciding whether the second parameter is equal to a first preset reference value to obtain a first decision result; and The first control subunit is for fixing the projecting unit at a current position when the first decision result indicates that the second parameter is equal to the first preset reference value to make the projecting unit project the first display picture of the first multimedia data.

(10) The electronic apparatus according to the above (8) or (9), wherein

The control unit includes a second deciding subunit, a first determining subunit, a second determining subunit and a second control subunit; wherein, The second deciding subunit is for deciding whether the second parameter is larger than or less than the first preset reference value to obtain a second decision result; and The first determining subunit is for determining the distance to be moved of the projecting unit as an absolute value of the second parameter and the direction to be moved of the projecting unit as a first direction when the second decision result indicates that the second parameter is larger than the first preset reference value; correspondingly The second control subunit is for moving the projecting unit to the first position based on the absolute value of the second parameter and the first direction; and The second determining subunit is for determining the distance to be moved of the projecting unit as the absolute value of the second parameter and the direction to be moved of the projecting unit as a second direction when the second decision result indicates that the second parameter is less than the first preset reference value; the second direction being opposite to the first direction; correspondingly, The second control subunit is for moving the projecting unit to the first position based on the absolute value of the second parameter and the second direction; and When the technical solution according to the sixth embodiment of the present invention is applied separately, the method for adjusting predetermined parameter, the adjusting device and the electronic apparatus according to the embodiments of the present invention can be configured as follows:

(11) A method for adjusting predetermined parameter for an electronic apparatus including a touch screen and a predetermined module having predetermined parameter, the method includes:

Detecting status of the touch screen at the time of initiating the predetermined module;

Enabling an operation sensing function of the touch screen when the status of the touch screen indicates that the operation sensing function of the touch screen is not turned on;

Acquiring an operation action on the entire touch screen of a user; and

Adjusting the predetermined parameter of the predetermined module according to the acquired operation action so that the electronic apparatus operates according to the adjusted predetermined parameter.

(12) The method according to the above (11), wherein enabling the operation sensing function of the touch screen specifically includes:

Enabling the operation sensing function of the touch screen in case that a display function of the touch screen is not turned on.

(13) The method according to the above (11), further includes:

Determining whether the operation action is processed by other modules of the electronic apparatus than the predetermined module in a predetermined time period after the operation action on the touch screen of the user is acquired when the status of the touch screen indicates that the operation sensing function of the touch screen is turned on;

Wherein, adjusting the predetermined parameter of the predetermined module according to the acquired operation action may be executed when it determines that the operation action is not processed by other modules in the predetermined time period.

(14) The method according to the above (11), wherein the predetermined module is a projecting module in the electronic apparatus, and the predetermined parameter is focal length of projection of the projective module.

(15) The method according to the above (14), wherein adjusting the predetermined parameter of the predetermined module according to the acquired operation action specifically includes:

Determining an operation direction of the acquired operation action; and

Determining direction of change of the focal length of projection according to the acquired operation direction.

(16) The method according to the above (11), wherein the predetermined module includes at least two working modes, adjusting the predetermined parameter of the predetermined module according to the acquired operation action specifically includes:

Determining the working mode of the predetermined module;

Establishing correspondence relationship between the operation action and the predetermined parameter based on the working mode; and Adjusting the predetermined parameter of the predetermined module according to the acquired operation action based on the correspondence relationship.

(17) An adjusting device for an electronic apparatus including a touch screen and a predetermined module having adjustable predetermined parameter, the adjusting device includes:

A detecting unit for detecting a status of the touch screen at the time of initiating the predetermined module;

An enabling unit for enabling an operation sensing function of the touch screen when the status of the touch screen detected by the detecting unit indicates that the operation sensing function of the touch screen is not turned on;

An acquiring unit for acquiring the operation action on the entire touch screen of the user; and An adjusting unit for adjusting the predetermined parameter of the predetermined module according to the acquired operation action so that an electronic apparatus operates according to the adjusted predetermined parameter.

(18) The adjusting device according to the above (17), wherein when the status of the touch screen indicates that the operation sensing function of the touch screen is not turned on, the enabling unit enables the operation sensing function of the touch screen in case that a display function of the touch screen is not turned on.

(19) The adjusting device according to the above (17), wherein the electronic apparatus further includes additional modules, and the adjusting device further includes a determining unit, The determining unit is for determining whether an operation action is processed by the additional modules of the electronic apparatus in a predetermined time period after the operation action on the touch screen of the user is acquired by the acquiring unit when the status of the touch screen detected by the detecting unit indicates that the operation sensing function of the touch screen is turned on, When the determining unit determines that the operation action is not processed by the additional modules in the predetermined time period, the adjusting unit adjusts the predetermined parameter of the predetermined module according to the acquired operation action.

(20) The adjusting device according to the above (17), wherein the predetermined module is a projecting module in the electronic apparatus, and the predetermined parameter is focal length of projection of the projective module.

(21) The adjusting device according to the above (20), wherein the adjusting unit adjusts the predetermined parameter through the following operations: determining an operation direction of the acquired operation action; determining a direction of change of the focal length of projection according to the acquired operation direction.

(22) The adjusting device according to the above (17), wherein the predetermined module includes at least two working modes, and the adjusting unit adjusts the predetermined parameter through the following operations:

Determining the working mode of the predetermined module;

Establishing correspondence relationship between the operation action and the predetermined parameter based on the working mode; and Adjusting the predetermined parameter of the predetermined module according to the acquired operation action based on the correspondence relationship.

(23) An electronic apparatus including:

A touch screen;

A predetermined module having adjustable predetermined parameter; and

The adjusting device according to any one of the above (17) to (22).

Further, when the technical solutions according to the first embodiment to the fifth embodiment of the present invention are combined with the technical solution according to the sixth embodiment of the present invention, the method for adjusting predetermined parameter, the adjusting device and the electronic apparatus according to the embodiments of the present invention may be configured as follows:

(24) The method according to any one of the above (11) to (16), wherein the electronic apparatus includes a projecting unit and a depth detecting unit, the projecting unit is able to project first multimedia data onto a target object;

Wherein, the method further includes:

Detecting depth information of the target object by using the depth detecting unit; and Calculating a second parameter of the projecting unit according to the depth information of the target object and a first parameter of the projecting unit;

Adjusting the predetermined parameter of the predetermined module according to the acquired operation action so that the electronic apparatus operates according to the adjusted predetermined parameter is specifically:

Moving the projecting unit to a first position based on the acquired operation action the second parameter of the projecting unit to make the projecting unit project a first display picture of the first multimedia data.

(25) The method according to the above (24), wherein

The target object include N target sub-objects and N is an integer larger than 1;

Correspondingly, detecting the depth information of the target object by using the depth detecting unit specifically includes:

Detecting N depth sub-information of the N target sub-objects by using the depth detecting unit; and Averaging the N depth sub-information to obtain the depth information of the target object.

(26) The method according to the above (24) or (25), wherein

Calculating the second parameter of the projecting unit according to the depth information of the target object and the first parameter of the projecting unit specifically includes:

Acquiring size information of the target object;

Calculating a third parameter of the projecting unit according to the size information of the target object and the first parameter of the projecting unit, the third parameter characterizing a distance between the projecting unit and the target object; and Calculating the second parameter of the projecting unit according to the third parameter and the depth information of the target object, the second parameter characterizing a distance and a direction to be moved of the projecting unit.

(27) The method according to the above (26), wherein, the method further includes:

Deciding whether the second parameter is equal to a first preset reference value to obtain a first decision result; and Fixing the projecting unit at a current position when the first decision result indicates that the second parameter is equal to the first preset reference value to make the projecting unit project the first display picture of the first multimedia data.

(28) The method according to the above (26) or (27), wherein, the method further includes:

Deciding whether the second parameter is larger than or less than the first preset reference value to obtain a second decision result;

Determining the distance to be moved of the projecting unit as an absolute value of the second parameter and the direction to be moved of the projecting unit as a first direction when the second decision result indicates that the second parameter is larger than the first preset reference value;

Moving the projecting unit to the first position based on the absolute value of the second parameter and the first direction;

Determining the distance to be moved of the projecting unit as the absolute value of the second parameter and the direction to be moved of the projecting unit as a second direction when the second decision result indicates that the second parameter is less than the first preset reference value, the second direction being opposite to the first direction; and Moving the projecting unit to the first position based on the absolute value of the second parameter and the second direction.

(29) The adjusting device according to any one of the above (7) to (12), the electronic apparatus includes a projecting unit which is able to project first multimedia data onto a target object;

Wherein, the adjusting device further includes a depth detecting unit and a calculating unit, wherein, The depth detecting unit is for detecting depth information of the target object; and The calculating unit is for calculating a second parameter of the projecting unit according to depth information of the target object and a first parameter of the projecting unit;

Wherein, the adjusting unit is specifically for:

Moving the projecting unit to a first position based on the acquired operation action the second parameter of the projecting unit to make the projecting unit project a first display picture of the first multimedia data.

(30) The adjusting device according to the above (29), wherein the target object includes N target sub-objects and N is an integer larger than 1;

Correspondingly, the depth detecting unit includes a depth detecting subunit and an averaging subunit;

Wherein,

The depth detecting subunit is for detecting N depth sub-information of the N target sub-objects; and The averaging subunit is for averaging the N depth sub-information to obtain the depth information of the target object.

(31) The adjusting device according to the above (29) or (30), wherein

The calculating unit includes an acquiring subunit, a first calculating subunit and a second calculating subunit; wherein, The acquiring subunit is for acquiring size information of the target object;

The first calculating subunit is for calculating a third parameter of the projecting unit according to the size information of the target object and the first parameter of the projecting unit, the third parameter characterizing a distance between the projecting unit and the target object; and The second calculating subunit is for calculating a second parameter of the projecting unit according to the third parameter and the depth information of the target object, the second parameter characterizing a distance and a direction to be moved of the projecting unit.

(32) The adjusting device according to the above (31), wherein

The control unit include a first deciding subunit and a first control subunit; wherein, The first deciding subunit is for deciding whether the second parameter is equal to a first preset reference value to obtain a first decision result; and The first control subunit is for fixing the projecting unit at a current position when the first decision result indicates that the second parameter is equal to the first preset reference value to make the projecting unit project the first display picture of the first multimedia data.

(33) The adjusting device according to the above (31) or (32), wherein

The control unit includes a second deciding subunit, a first determining subunit, a second determining subunit and a second control subunit; wherein, The second deciding subunit is for deciding whether the second parameter is larger than or less than the first preset reference value to obtain a second decision result; and The first determining subunit is for determining the distance to be moved of the projecting unit as an absolute value of the second parameter and the direction to be moved of the projecting unit as a first direction when the second decision result indicates that the second parameter is larger than the first preset reference value; correspondingly The second control subunit is for moving the projecting unit to the first position based on the absolute value of the second parameter and the first direction; and The second determining subunit is for determining the distance to be moved of the projecting unit as the absolute value of the second parameter and the direction to be moved of the projecting unit as a second direction when the second decision result indicates that the second parameter is less than the first preset reference value; the second direction being opposite to the first direction; correspondingly, The second control subunit is for moving the projecting unit to the first position based on the absolute value of the second parameter and the second direction;

(34) An electronic apparatus including:

A touch screen;

A predetermined module having adjustable predetermined parameter; and

The adjusting device according to any one of the above (29) to (33).

Each embodiment of the present invention is described detailed above. However, those skilled in the art should understand, these embodiments can be made various modifications, combinations or sub-combinations without departing from the principle and spirit of the present invention, and such modification should fall into the range of the present invention.

Those skilled in the art should understand that, the embodiment of the present invention can be provided as method, system or computer program product. Therefore, the present invention can adopt forms of full hardware embodiment, full software embodiment, or embodiment combining software and hardware aspects. Further, any combination of one or more computer readable medium(s) may be utilized by the present invention. The computer readable medium may be a computer readable signal medium or a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In case of relating to a remote computer, the remote computer may be connected to the user's computer through any type of network, including a local area network (LAN) or a wide area network (WAN), or the connection may be made to an external computer (for example, through the Internet using an Internet Service Provider).

The present invention is described by referring to flow chart and/or block diagram of method, apparatus (system) and computer program product according to the embodiments of the present invention. It should understand that each flow and/or block in the flow chart and/or block diagram and the combination of the flow and/or block in the flow chart and/or block diagram can be implemented by computer program instruction. These computer program instruction can be provided to processors of a general purpose computer, a dedicated computer, an embedded processor or other programmable data processing apparatus to generate a machine, so that a device for implementing functions specified in one or more flow of the flow chart and/or one or more block of the block diagram is generated by the instruction executed by the processor of the computer or other programmable.

These computer program instruction can also be stored computer readable storage which is able to direct the computer or other programmable data processing apparatus to operate in specific manners, so that the instruction stored in the computer readable storage generates manufactured article including commander equipment, the commander equipment implements functions specified by one or more flow in the flow chart and/or one or more block in the block diagram.

These computer program instruction can be loaded to computer or other programmable data processing apparatus, so that a series of operation steps are executed on the computer or other programmable apparatus to generate computer implemented process, so that the instruction executed on the computer or other programmable apparatus provide steps for implementing functions specified in one or more flow of the flow chart and/or one or more block of the block diagram.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, it needs to note that, in the specification, terms of "comprise", "include" and any other variations thereof intend to cover nonexclusive inclusion so that the procedure, the method, the product or the equipment including a series of elements not only includes these elements, but also include other elements which are not listed explicitly, or also include inherent elements of these procedure, method, product or equipment. In case that there is no more limitation, the element defined by statement "including one . . . " does not exclude there is additional same element in the procedure, method, article or apparatus including the element.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A control method applied in an electronic apparatus including a projecting unit and a depth detecting unit, the projecting unit being able to project first multimedia data onto a target object; wherein, the method comprises:
    detecting depth information of the target object by using the depth detecting unit;
    calculating a second parameter of the projecting unit according to the depth information of the target object and a first parameter of the projecting unit, the first parameter including a focal length of the projecting unit, the second parameter characterizing a distance and a direction to be moved of the projecting unit; and
    moving the projecting unit to a first position based on the second parameter of the projecting unit, the projecting unit at the first position projecting a first display picture of the first multimedia data.

2. The control method according to claim 1, wherein the target object includes N target sub-objects wherein N is an integer larger than 1; correspondingly, detecting the depth information of the target object by using the depth detecting unit wherein the detecting comprises:
    detecting N depth sub-information of the N target sub-objects by using the depth detecting unit; and
    averaging the N depth sub-information to obtain the depth information of the target object.

3. The control method according to claim 1, wherein calculating the second parameter of the projecting unit according to the depth information of the target object and the first parameter of the projecting unit comprises:
    acquiring size information of the target object;
    calculating a third parameter of the projecting unit according to the size information of the target object and the first parameter of the projecting unit, the third parameter characterizing a distance between the projecting unit and the target object; and
    calculating the second parameter of the projecting unit according to the third parameter and the depth information of the target object.

4. The control method according to claim 3, wherein the method further includes:
    deciding whether the second parameter is equal to a first preset reference value to obtain a first decision result; and
    fixing the projecting unit at a current position when the first decision result indicates that the second parameter is equal to the first preset reference value to make the projecting unit project the first display picture of the first multimedia data.

5. The control method according to claim 3, wherein the method further includes:
    deciding whether the second parameter is larger than or less than the first preset reference value to obtain a second decision result;
    determining the distance to be moved of the projecting unit as an absolute value of the second parameter and the direction to be moved of the projecting unit as a first direction when the second decision result indicates that the second parameter is larger than the first preset reference value;
    moving the projecting unit to the first position based on the absolute value of the second parameter and the first direction;
    determining the distance to be moved of the projecting unit as the absolute value of the second parameter and the direction to be moved of the projecting unit as a second direction when the second decision result indicates that the second parameter is less than the first preset reference value, the second direction being opposite to the first direction; and
    moving the projecting unit to the first position based on the absolute value of the second parameter and the second direction.

6. A method for adjusting predetermined parameter for an electronic apparatus including a touch screen and a predetermined module having predetermined parameter, the method includes:
    detecting a status of the touch screen at the time of initiating the predetermined module, the status of the touch screen including whether an operation sensing function of the touch screen is turned on;
    turning on the operation sensing function of the touch screen when the status of the touch screen indicates that the operation sensing function of the touch screen is not turned on;
    acquiring an operation action on the entire touch screen of the user; and
    adjusting the predetermined parameter of the predetermined module according to the acquired operation action, the electronic apparatus operating according to the adjusted predetermined parameter.

7. The method according to claim 6, wherein enabling the operation sensing function of the touch screen comprises enabling the operation sensing function of the touch screen when a display function of the touch screen is not turned on.

8. The method according to claim 6, further comprises determining whether an operation action is processed by other modules of the electronic apparatus than the predetermined module in a predetermined time period after the operation action on the touch screen of the user is acquired when the status of the touch screen indicates that the operation sensing function of the touch screen is turned on;
    wherein, adjusting the predetermined parameter of the predetermined module according to the acquired operation action may be executed when it is determined that the operation action is not processed by other modules in the predetermined time period.

9. The method according to claim 6, wherein the predetermined module is a projecting module in the electronic apparatus and the predetermined parameter is focal length of projection of the projective module.

10. The method according to claim 9, wherein adjusting the predetermined parameter of the predetermined module according to the acquired operation action comprises:
    determining an operation direction of the acquired operation action; and
    determining a direction of change of the focal length of projection according to the acquired operation direction.

11. The method according to claim 6, wherein the predetermined module includes at least two working modes, and adjusting the predetermined parameter of the predetermined module according to the acquired operation action comprises:
   determining a working mode of the predetermined module;
   establishing correspondence relationship between the operation action and the predetermined parameter based on the working mode; and
   adjusting the predetermined parameter of the predetermined module according to the acquired operation action based on the correspondence relationship.

12. An adjusting device for an electronic apparatus including a touch screen and a predetermined module having adjustable predetermined parameter, the adjusting device comprises:
   a detecting unit for detecting a status of the touch screen at the time of initiating the predetermined module, the status of the touch screen including whether an operation sensing function of the touch screen is turned on;
   an enabling unit for turning on the operation sensing function of the touch screen when the status of the touch screen detected by the detecting unit indicates that the operation sensing function of the touch screen is not turned on;
   an acquiring unit for acquiring an operation action of a user on the entire touch screen; and
   an adjusting unit for adjusting the predetermined parameter of the predetermined module according to the acquired operation action, the electronic apparatus operating according to the adjusted predetermined parameter.

13. The adjusting device according to claim 12, wherein the electronic apparatus further includes additional modules, and the adjusting device further includes a determining unit, wherein the determining unit determines whether an operation action is processed by the additional modules of the electronic apparatus in a predetermined time period after the operation action on the touch screen of the user is acquired by the acquiring unit when the status of the touch screen detected by the detecting unit indicates that the operation sensing function of the touch screen is turned on, and when the determining unit determines that the operation action is not processed by the additional modules in the predetermined time period, the adjusting unit adjusts the predetermined parameter of the predetermined module according to the acquired operation action.

14. The adjusting device according to claim 12, wherein the predetermined module is a projecting module in the electronic apparatus and the predetermined parameter is a focal length of projection of the projective module and wherein the adjusting unit adjusts the predetermined parameter through the following operations:
   determining an operation direction of the acquired operation action; and
   determining direction of change of the focal length of projection according to the acquired operation direction.

15. The adjusting device according to the claim 12, wherein the predetermined module includes at least two working modes, and the adjusting unit adjusts the predetermined parameter through the following operations:
   determining a working mode of the predetermined module;
   establishing correspondence relationship between the operation action and the predetermined parameter based on the working mode; and
   adjusting the predetermined parameter of the predetermined module according to the acquired operation action based on the correspondence relationship.

16. The adjusting device according to claim 12, wherein the electronic apparatus includes a projecting unit which is able to project first multimedia data onto a target object; wherein,
   the adjusting device further includes a depth detecting unit and a calculating unit,
   the depth detecting unit detects depth information of the target object; and
   the calculating unit calculates a second parameter of the projecting unit according to depth information of the target object and a first parameter of the projecting unit;
   the adjusting unit moves the projecting unit to a first position based on the acquired operation action the second parameter of the projecting unit to make the projecting unit project a first display picture of the first multimedia data.

17. The adjusting device according to claim 16, wherein the target object includes N target sub-objects and N is an integer larger than 1;
   correspondingly, the depth detecting unit includes a depth detecting subunit and an averaging subunit; wherein,
   the depth detecting subunit detects N depth sub-information of the N target sub-objects; and
   the averaging subunit averages the N depth sub-information to obtain the depth information of the target object.

18. The adjusting device according to claim 16, wherein the calculating unit includes an acquiring subunit, a first calculating subunit and a second calculating subunit; wherein,
   the acquiring subunit acquires size information of the target object;
   the first calculating subunit calculates a third parameter of the projecting unit according to the size information of the target object and the first parameter of the projecting unit, the third parameter characterizing a distance between the projecting unit and the target object; and
   the second calculating subunit calculates a second parameter of the projecting unit according to the third parameter and the depth information of the target object, the second parameter characterizing a distance and a direction to be moved of the projecting unit.

19. The adjusting device according to claim 18, wherein the control unit includes a first deciding subunit and a first control subunit;
   the first deciding subunit decides whether the second parameter is equal to a first preset reference value to obtain a first decision result; and
   the first control subunit fixes the projecting unit at a current position when the first decision result indicates that the second parameter is equal to the first preset reference value to make the projecting unit project the first display picture of the first multimedia data.

20. The adjusting device according to claim 18, wherein the control unit includes a second deciding subunit, a first determining subunit, a second determining subunit and a second control subunit; wherein,
   the second deciding decides whether the second parameter is larger than or less than a first preset reference value to obtain a second decision result; and
   the first determining subunit determines the distance to be moved of the projecting unit as an absolute value of the second parameter and the direction to be moved of the projecting unit as a first direction when the second decision result indicates that the second parameter is larger than the first preset reference value; correspondingly the second control subunit moves moving the projecting unit to the first position based on the absolute value of the second parameter and the first direction; and the second determining subunit determines the distance to be moved of the projecting unit as the absolute value of the second parameter and the direction to be moved of the projecting unit as a second direction when the second decision result indicates that the second parameter is less than the first preset reference value; the second direction being opposite to the first direction; correspondingly, the second control subunit moves the projecting unit to the first position based on the absolute value of the second parameter and the second direction.

* * * * *